(12) United States Patent
Sugawara et al.

(10) Patent No.: US 6,481,854 B1
(45) Date of Patent: Nov. 19, 2002

(54) PROJECTION TYPE DISPLAY APPARATUS HAVING AIR COOLING ARRANGEMENT

(75) Inventors: Mari Sugawara; Tetsuya Hamada; Tetsuya Kobayashi; Toshihiro Suzuki; Takeshi Gotoh; Keiji Hayashi; Hisashi Yamaguchi; Noriyuki Ohashi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/452,223

(22) Filed: Dec. 1, 1999

(30) Foreign Application Priority Data

Dec. 28, 1998 (JP) .......................... 10-374710
Jan. 29, 1999 (JP) .......................... 11-021633

(51) Int. Cl.[7] .......................... G03B 21/16; G03B 21/18
(52) U.S. Cl. .......................... 353/52; 353/57; 353/58; 353/60; 353/61
(58) Field of Search .............. 353/20, 50, 52, 353/57, 58, 59, 60, 61

(56) References Cited

U.S. PATENT DOCUMENTS

| | | | | |
|---|---|---|---|---|
| 4,925,295 A | * | 5/1990 | Ogawa et al. | 353/57 |
| 5,615,028 A | * | 3/1997 | Ishiguro et al. | 349/42 |
| 5,806,952 A | * | 9/1998 | Fujimori | 353/119 |
| 5,860,719 A | * | 1/1999 | Suzuki et al. | 353/61 |
| 5,951,136 A | * | 9/1999 | Furuhata et al. | 353/31 |
| 6,007,205 A | * | 12/1999 | Fujimori | 353/57 |
| 6,065,838 A | * | 5/2000 | Konuma et al. | 353/61 |
| 6,111,630 A | * | 8/2000 | Watanuki et al. | 349/161 |
| 6,132,049 A | * | 10/2000 | Yamaguchi et al. | 353/61 |
| 6,139,155 A | * | 10/2000 | Takizawa | 353/57 |

FOREIGN PATENT DOCUMENTS

| | | |
|---|---|---|
| JP | 2168697 | 6/1990 |
| JP | 675160 | 3/1994 |
| JP | 829874 | 2/1996 |

* cited by examiner

Primary Examiner—Russell Adams
Assistant Examiner—Rodney Fuller
(74) Attorney, Agent, or Firm—Greer, Burns & Crain, Ltd.

(57) ABSTRACT

The projection type display apparatus has liquid crystal panels with polarizers, a light source, a power supply, and a ballast. A cooling device is arranged in the apparatus such that a first set of cooling fans blow cooling air to cool the liquid crystal panels and the polarizers, and a second set of cooling fans suck the cooling air passing through the liquid crystal panels and the polarizers and blow the cooling air to independently cool the light source, the power supply, and the ballast. Therefore, a projection type display apparatus with little light leakage and low noise can be realized. The invention also provides a cooling unit, for the light source, which includes a movable lamp house and a duct with a cooling fan.

51 Claims, 37 Drawing Sheets

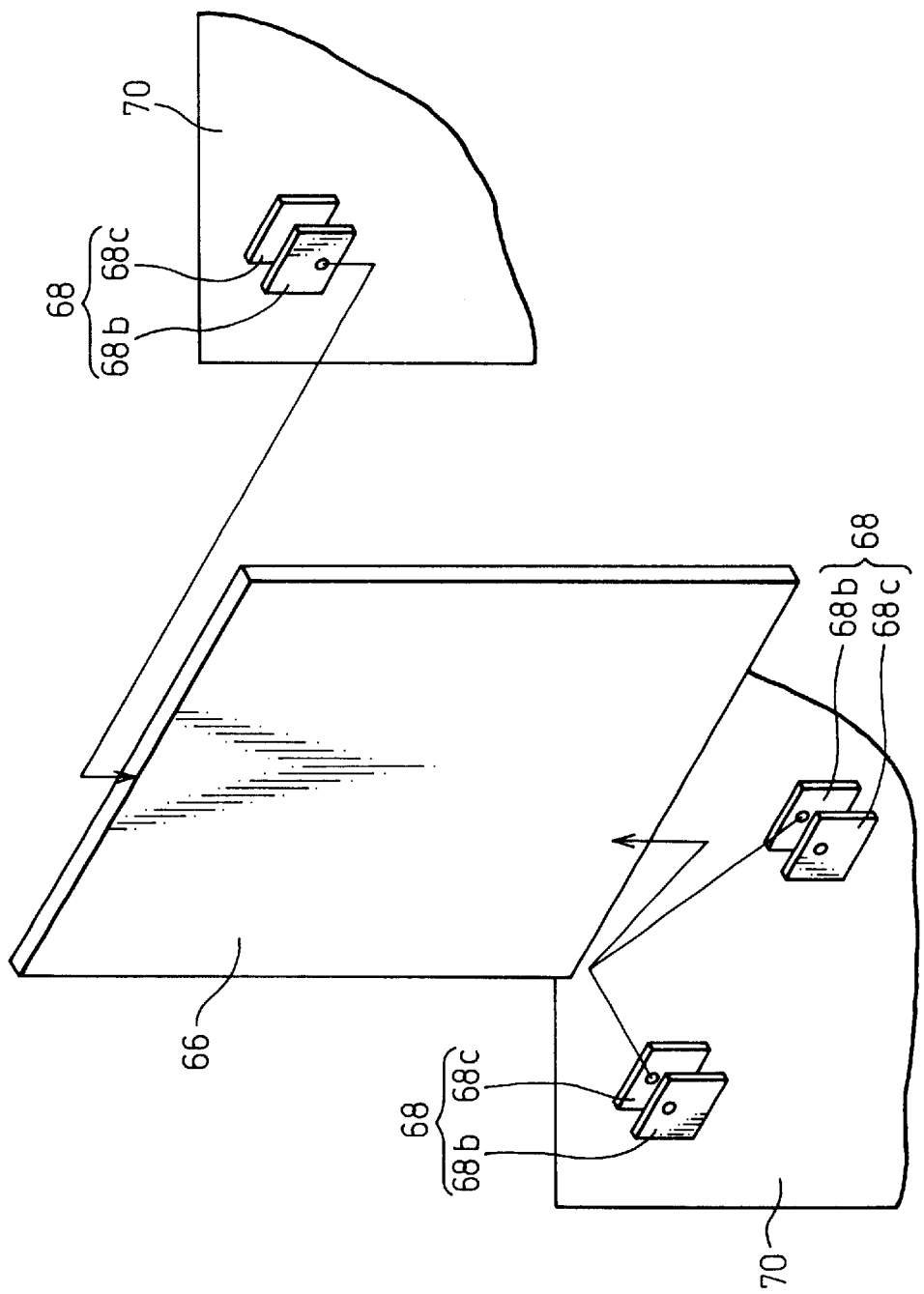

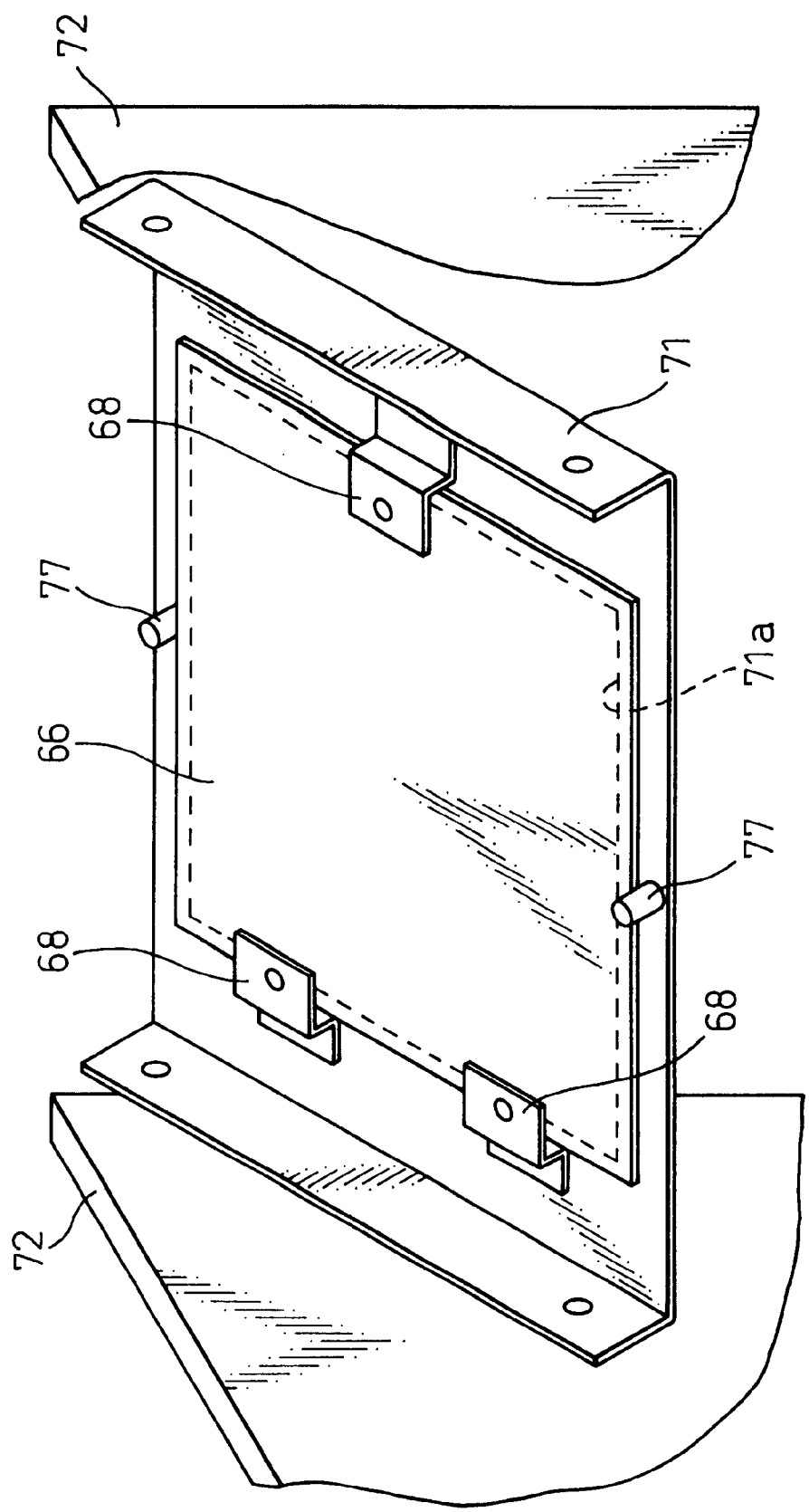

PROJECTION TYPE DISPLAY APPARATUS HAVING AIR COOLING ARRANGEMENT

BACKGROUND OF THE INVENTION

1. Field of the Invention

The present invention relates to a projection type display apparatus using a light valve. Further, the present invention relates to a projection type display apparatus comprising a light source, at least one optical element and a projection lens.

2. Description of the Related Art

A projection type display apparatus comprises a light source, a light valve such as a liquid crystal panel and a projection lens, in which the image light formed by the light valve is projected onto a screen by the projection lens thereby to form an enlarged image on the screen. A projection type color display apparatus, on the other hand, comprises a light source, color separation means for separating the light of the light source into color light beams of red, green and blue, a plurality of light valves for modulating each of the separated color light beams, color synthesizing means for synthesizing the image light beams formed by a plurality of the light valves into one synthesized light, and a projection lens for projecting the synthesized light.

The projection type display apparatus includes a housing, and all the members described above are arranged in the housing. The housing shields the light so that no light other than the light projected from the projection lens leaks out. The light source and the light valves generate heat. If the heat remains in the housing and the internal temperature increases, the operation of the parts is adversely affected. In view of this, one intake fan and one exhaust fan are arranged in the housing so that cooling air flows in the housing.

The cooling air flowing in the housing cools the light valves and the polarizers which generate considerable heat mainly due to the absorption of light, and is further adapted to cool other heat generating members such as the power supply, the light source and the ballast. With the trend of miniaturization of the projection type display apparatus, however, the increased density of the members arranged in the housing and the increased light density and light fluxes, to meet the required image clarity, tends to increase the amount of heat generated in the housing. For this reason, it has become difficult for the single intake fan and the single exhaust fan to efficiently circulate the cooling air to reach all the heat generating members. It has thus become necessary to arrange a plurality of large capacity intake fans in the vicinity of the light valves, the light sources and all other heat generating members, respectively, to supply fresh air directly to each heat generating member.

The color separation means and the color synthesizing means are configured with dichroic mirrors. Each of the dichroic mirror and the total reflection mirror is held to a fixed structure by a holding member. For supporting the mirror, for example, a support plate having a rectangular opening is used. The mirror is larger than the rectangular opening, and is arranged on one surface of the support plate while covering the rectangular opening. The support plate includes two holding members for holding the mirror at the two opposed sides thereof, and each holding member is an elongated fitting extending along each side of the mirror. The support plate is mounted to a pair of bases extending in the direction parallel to the light path.

In the configuration with a plurality of large capacity intake fans arranged in the vicinity of all the heat generating members including the light valves and the light source, respectively, to supply fresh air directly to each heat generating member, the intake fans are arranged at a plurality of positions in the housing, and intake holes are required at a plurality of positions in the housing. This poses the problem of light leaking out of the housing. Also, a plurality of the intake fans constitute a noise source and, in the resulting apparatus, noise is a crucial problem.

Also, in the case where the light source including a lamp and a reflector is cooled, the cooling air should be led to the front side of the reflector to cool the lamp directly. However, cables and the like are arranged on the rear side of the reflector, and it has been found that the cables and the like must not be overheated as it has an undesirable effect. Also, the light source is desirably arranged in the housing replaceably, and the cooling unit for the light source desirably is adapted to meets the requirements of the replacing the light source.

Also, regarding the dichroic mirrors and the total reflection mirrors of the color separation means and the color synthesizing means, the elongated holding members hold the mirror between the holding member and the support plate. If the support plate or the holding members, which are to be flat, are warped, the problem is posed of a distorted mirror. In other words, two straight lines not parallel to each other cannot form one plane and thus cause a distortion in the mirror. The distorted mirror distorts the direction in which the light is reflected on the mirror, thereby leading to the problem of variations in the characteristics of the optical system. A similar problem is encountered when arranging a mirror between the projection lens and the screen. For this reason, in the prior art, the thickness of the mirror is increased and the strength of the support plate is also increased while at the same time increasing the accuracy thereof to prevent mirror distortion. This method, however, increases the weight of the mirror and the support member for an increased mirror cost.

Further, the following problem is posed.

A projection type liquid crystal display apparatus comprises a light source, a liquid crystal panel having a substantially rectangular display portion, a projection lens and a pair of polarizers arranged on the opposite sides of the liquid crystal panel. The light emitted from the light source is linearly polarized by the polarizer on the light incidence side and enters the liquid crystal panel. The light is spatially modulated in the liquid crystal panel based on the image information. The light emitted from the liquid crystal panel is projected by the projection lens through the polarizer on the light emission side. Also, a condenser lens is arranged before the polarizer on the light incidence side. In the case of a projection type liquid crystal display apparatus for color display, three sets of liquid crystal panels, polarizers, condenser lenses and color separation and synthesizing members are arranged.

For increasing the brightness of the projection type liquid crystal display apparatus, the amount of light entering the polarizer and the liquid crystal panels must be increased. In the case where the light amount entering the polarizers and the liquid crystal panels, however, the problem is that the polarizers and the liquid crystal panels generate heat due to light absorption. Assuming that the light source is a 350 W metal halide lamp, for example, the amount of light (energy) entering the polarizer on the light incidence side after color separation is about 8 W, of which about 50% is absorbed into the polarizer on the light incidence side, so that the heat of about 4 W is generated in the vicinity of the liquid crystal panels.

The polarizers and the liquid crystal panels are generally cooled by air. Specifically, the air is sent into the projection type liquid crystal display apparatus by fan, so that the cooling air cools the polarizers and the liquid crystal panels. The polarizers and the liquid crystal panels are efficiently cooled as the cooling air passes through the space between the polarizer and the liquid crystal panel in the direction substantially parallel to the surface of the polarizer and the liquid crystal panel.

Japanese Unexamined Patent (Kokai) No. 2-168697 discloses a radiation fin having an oblique protrusion arranged in a duct thereby to generate a main air flow substantially straight along the duct and a subsidiary air flowing along the duct ceiling and directed downward. The heat generating members to be cooled, however, are arranged on the bottom of the duct, and the air generally flows in a predetermined direction along the surface of the heat generating members.

Japanese Unexamined Patent (Kokai) No. 8-29874 discloses a projection type liquid crystal display apparatus comprising a rectifier fin inserted between a polarizer and a liquid crystal panel, in which the cooling air is blown between the polarizer and the liquid crystal panel.

In the projection type liquid crystal display apparatus, a superior cooling operation can be performed by sending the cooling air in the direction substantially parallel to the surface of optical elements such as the polarizer and the liquid crystal panel. With the increase in brightness of the projection type liquid crystal display apparatus, however, a cooling means capable of more effective cooling is desired.

SUMMARY OF THE INVENTION

An object of the present invention is to provide a projection type display apparatus capable of appropriately cooling internal heat generating members with only a little light leakage and low noise.

A projection type display apparatus according to the present invention comprises a housing, at least one light valve arranged in the housing for forming an image light, a projection lens arranged in the housing for projecting in enlarged form the image light formed by said at least one light valve, at least one heat generating member arranged in the housing, at least one first fan for introducing cooling air into the housing so that the cooling air comes into contact with said at least one light valve, at least one second fan arranged in the housing so that the cooling air comes into direct contact with said at least one heat generating member, and at least one third fan for exhausting the cooling air out of the housing.

In view of this, an air intake fan is provided for the light valve of each color of R, G, and B and the light valves are individually cooled. These three fans are sirocco fans high in air resistance, and arranged on the bottom of the apparatus as intake fans for the apparatus. The housing has at least an air inlet in the bottom portion thereof. By concentrating the air inlets in the bottom portion of the housing, the light or noise leakage out of the apparatus is eliminated.

Fans are individually provided for other heat generating members including the light source, the power supply, and the ballast, whereby the capacity required for cooling these members is adjusted separately for each member. The air is introduced into the housing by way of the intake air fan, and a portion of the cooling air that has cooled the light valve is absorbed into the cooling fan of the other heat generating member. The other heat generating member is thus cooled, and the cooling air is exhausted out of the apparatus by the exhaust fan. The remainder of the air after cooling the light valve is released out of the apparatus by the exhaust fan through an appropriate path. The light source, the power supply, and the stabilizer have ducts or the like as an outlet of the cooling air in the vicinity of the light source, the power supply and the stabilizer.

By appropriately maintaining the path of the cooling air in the apparatus as described above, the cooling air is efficiently distributed over the heat generating members in the apparatus, so that the heat generating members are efficiently cooled without air stagnation or circulation in the apparatus. The heat generating members are cooled efficiently in this way, and therefore the rotational speed of the fan, i.e. the wind velocity is not increased unnecessarily. Thus the noise of the fan is minimized. The fans other than the intake fan do not propagate the noise directly out of the apparatus. Thus the noise of the apparatus itself can be minimized.

BRIEF DESCRIPTION OF THE DRAWINGS

The present invention will become more apparent from the following description of the preferred embodiments, with reference to the accompanying drawings, in which:

FIGS. 43A to 43G are views showing various examples of the curved shape of the protrusions of the holding member, in which FIG. 43A is a plan view showing the arm portion having a protrusion, FIG. 43B is a cross-sectional view showing an arm portion having a protrusion in the shape of V-grooved stop, FIG. 43C is a front view of the arm portion of FIG. 43B, FIG. 43D is a cross-sectional view showing the arm portion having a protrusion in the shape of hemispherical stop, FIG. 43E is a front view of the arm portion of FIG. 43D, FIG. 43F is a cross-sectional view showing the arm portion having a protrusion in the shape of quadrant stop, and FIG. 43G is a front view of the arm portion of FIG. 43F;

FIG. 44 is a perspective view showing another example of the mirror support unit;

FIG. 45 is a perspective view showing another example of the mirror support unit;

DESCRIPTION OF THE PREFERRED EMBODIMENTS

Figure 1:
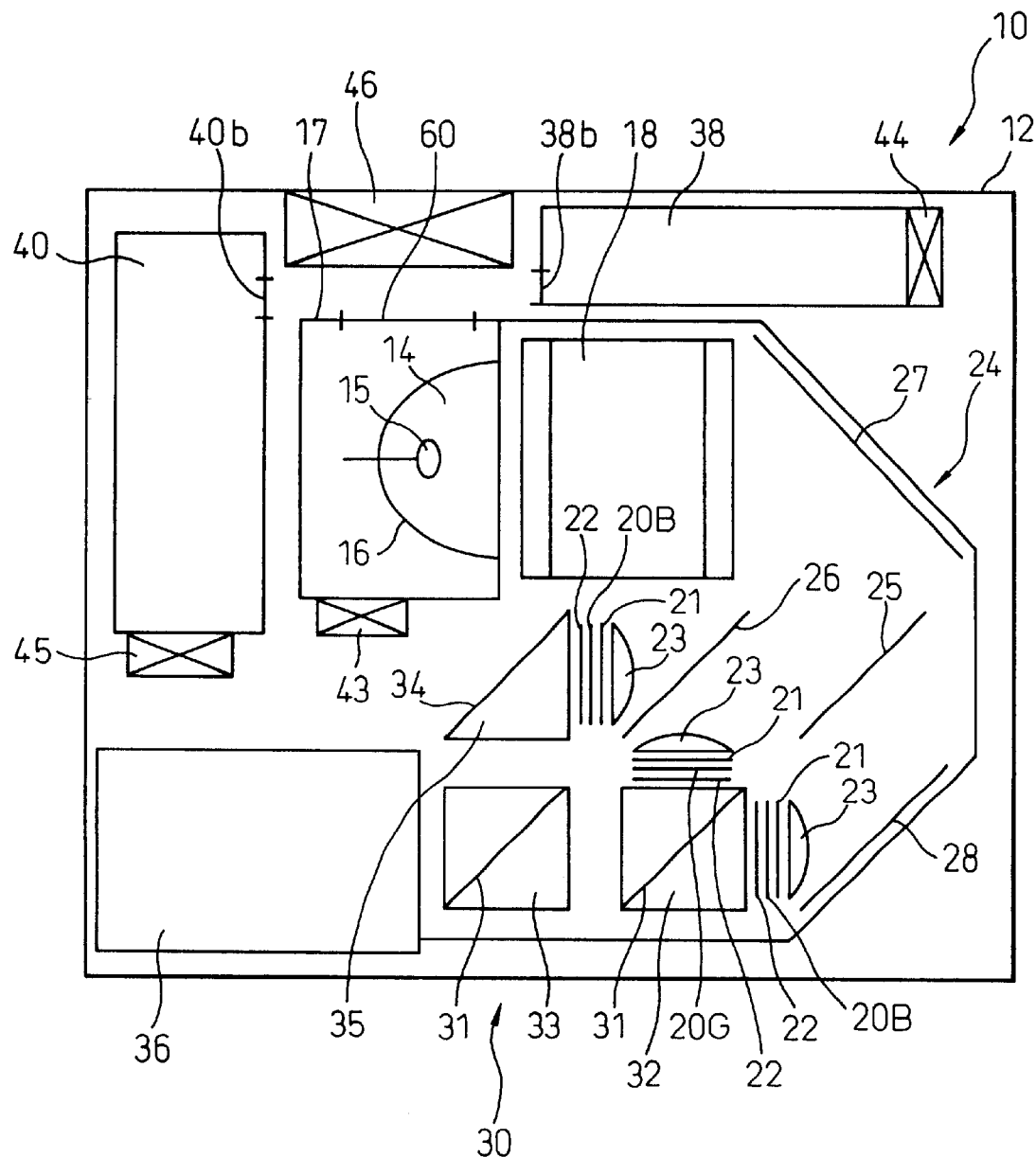
FIG. 1 is a plan view showing a projection type display apparatus according to the first embodiment of the present invention.

FIG. 1 shows a projection type display apparatus according to the first embodiment of the present invention. The projection type display apparatus 10 comprises a housing 12, and members described herein below are arranged in the housing 12.

The projection type display apparatus 10 comprises a light source 14, a polarized light conversion unit 18, three light valves 20R, 20G and 20B, a color separation means 24, a color synthesizing means 30, and a projection lens 36. Further, the projection type display apparatus 10 comprises a power supply 38 and a ballast 40 for stabilizing the light source.

The light source 14 includes a lamp 15 such as a metal halide lamp and a parabolic reflector 16. The light source 14 is arranged in a lamp house 17.

The polarized light conversion unit 18 is provided for converting the white light generated by the light source 14 into a predetermined linear polarized light. The polarized light conversion unit 18 allows one of the two linear polarized light components crossing at right angles to each other to pass as such, while rotating the polarization plane of the other linear polarized light component by 90 degrees and thus allowing it to pass in the same polarization plane as the first linear polarized light component. As a result, the light utilization efficiency can be improved. The polarized light conversion unit 18 can be omitted.

The light valves 20R, 20G and 20B comprise liquid crystal panels, for example, for forming red, green and blue images. Polarizers 21 and 22 are arranged on the opposite sides of each light valve, and a condenser lens 23 is located on the light incidence side of each light valve.

The color separation means 24 includes two dichroic mirrors 25 and 26 and two total reflection mirrors 27 and 28. The dichroic mirror 25 reflects the red and green light beams, for example, contained in the white light and allows the blue light beam to pass. The dichroic mirror 26, on the other hand, reflects the green light beam, for example, and passes the red light beam. Thus, the light from the light source 14 is separated into color light beams of red, green and blue by the color separation means 24, and respective color light beams enter the light valves 20R, 20G, 20B.

The color synthesizing means includes two transparent cubic blocks 32 and 33 each with two triangular prisms sandwiching a dichroic film 31, and one transparent cubic block 35 having a triangular prism having a total reflection film 34. The dichroic film 31 of the block 32 synthesizes the image light beams from the blue light valve 20B and the green light valve 20G, and the dichroic film 31 of the block 33 synthesizes the blue and green image light beams with the image light beam from the red light valve 20R. In this way, one synthesized light is finally produced and projected in enlarged form onto a screen, not shown, by the projection lens 36.

Figures 8A, 8B:
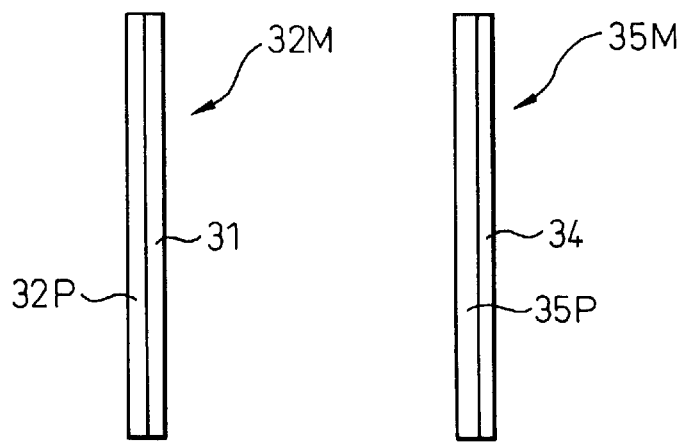
FIG. 8A is a view showing the dichroic mirror of the color synthesizing means.
FIG. 8B is a view showing the total reflection mirror of the color synthesizing means.

A dichroic mirror 32M with the dichroic film 31 attached to a transparent support plate 32P can be used, as shown in FIG. 8A, in place of the transparent block 32 having the dichroic film 31. This is also the case with the other transparent block 33. Further, a total reflection mirror 35M with the total reflection film 34 attached to the transparent support plate 35P can be used, as shown in FIG. 8A, in place of the transparent block 35 having the total reflection film 34.

Figure 2:
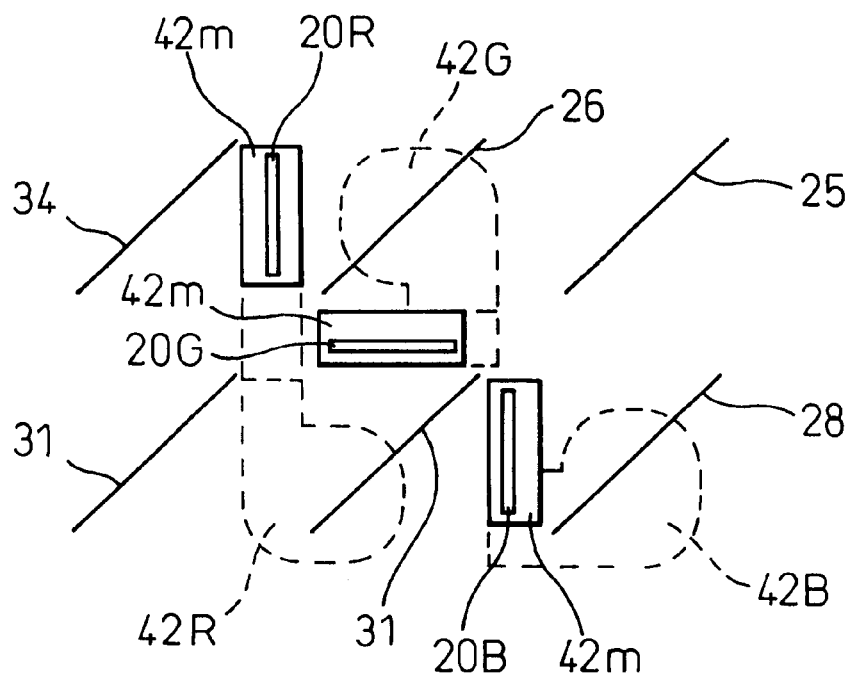
FIG. 2 is a plan view showing a part of the housing, omitting some members of FIG. 1 for illustrating the air intake fan.

FIG. 2 is a plan view showing a part of the housing 12 in which source members of FIG. 1 are omitted to show the air intake fan. In FIG. 2, the light valves 20R, 20G and 20B are shown, while the polarizers 21 and 22 and the condenser lens 23 are omitted. In FIG. 2, three intake fans 42R, 42G and 42B are arranged in the bottom of the housing 12, so that the cooling air is taken in upward from the bottom of the housing 12.

Figure 3:
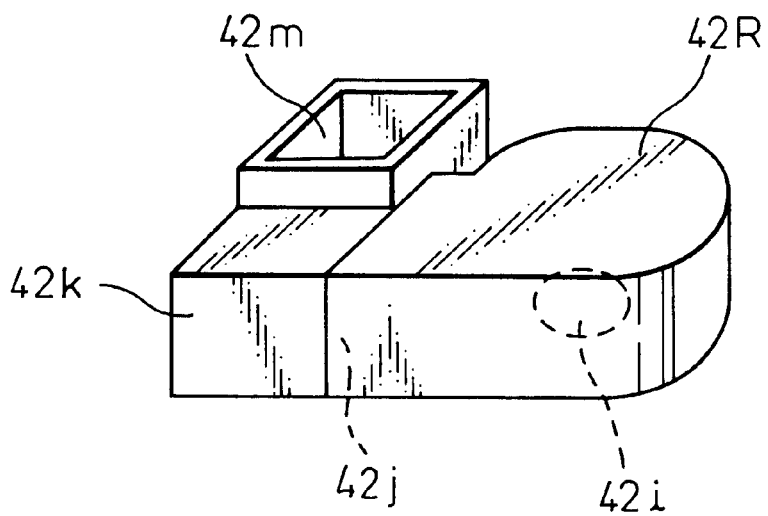
FIG. 3 is a perspective view of the sirocco fan.

Each of the intake fans 42R, 42G and 42B is configured with a sirocco fan, as shown in FIG. 3. The sirocco fan is substantially snail-shaped, and has an air inlet 42i and an air outlet 42j. A duct 42k is attached to the outlet 42j. The duct 42k has an air outlet 42m.

FIG. 2 shows the air outlet 42m of the duct 42k of each of the intake fans 42R, 42G and 42B. The light valves 20R, 20G and 20B are arranged just above the air outlets 42m of the ducts 42k of the corresponding intake fans 42R, 42G and 42B. More specifically, the air outlet 42m of the ducts 42k connected to the intake fan 42R is arranged under the light valve 20R, the air outlet 42m of the duct 42k connected to the intake fan 42G is arranged under the light valve 20G, and the air outlet 42m of the duct 42k connected to the intake fan 42B is arranged under the light valve 20B. The cooling air is blown out toward the light valves 20R, 20G and 20B and the polarizers 21 on the incidence side thereof, respectively. As a result, the light valves 20R, 20G and 20B and the polarizers on the incidence side are cooled by the cooling air just introduced from outside.

Figure 4:
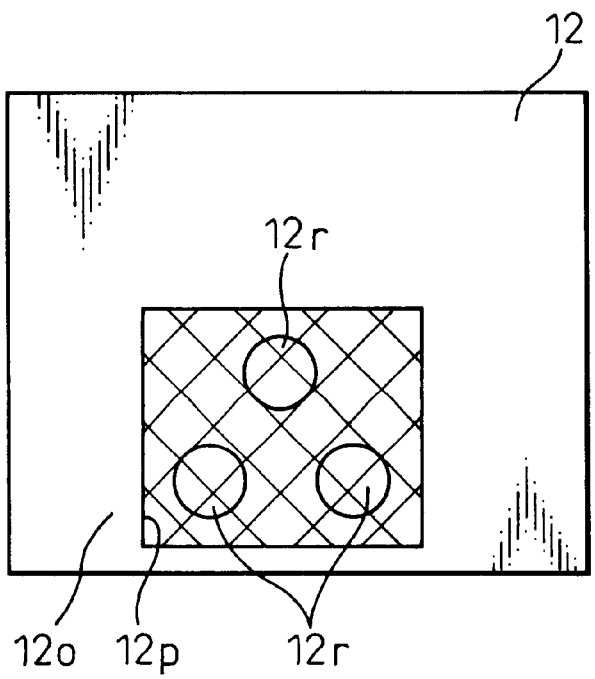
FIG. 4 is a bottom view of the housing of the apparatus of FIG. 1.
Figure 5:
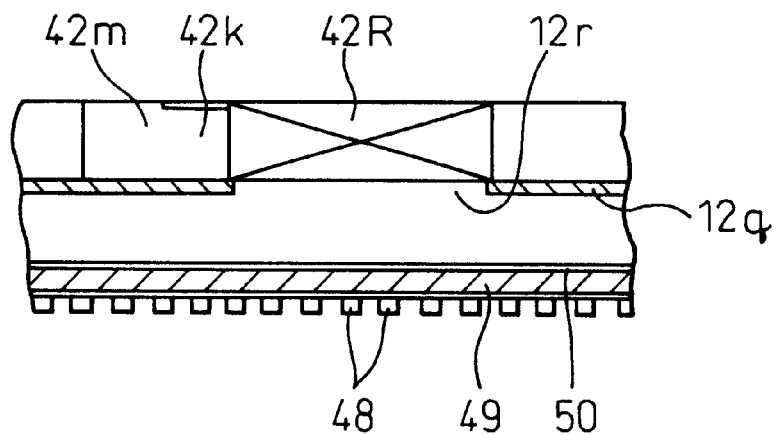
FIG. 5 is a cross-sectional view showing the bottom portion of the housing of the apparatus of FIG. 4.

FIG. 4 is a bottom view of the housing 12 of the apparatus shown in FIG. 1. FIG. 5 is a cross-sectional view of the bottom portion of the housing 12 of the apparatus shown in FIG. 4. In FIGS. 4 and 5, the bottom outer wall 12o of the housing 12 has an opening 12p. A grid 48, a filter 49 and a metal net 50 are arranged in the opening 12p in that order from outside. In the opening 12p of the bottom outer wall 12o of the housing 12, the bottom inner wall 12q of the housing 12 has three openings 12r. The intake fans 42R, 42G and 42B are mounted to the bottom inner wall 12q of the housing 12 in such a manner as to introduce the air from the opening 12p. The air outlet 42m of the duct 42k connected to the intake fan 42R (42G, 42B) is opened upward. Consequently, as described above, the cooling air is blown out toward the light valves 20R, 20G and 20B and the polarizers 21 on the incidence side thereof from the air outlet 42m.

Further, in FIG. 1, fans 43, 44 and 45 are arranged in the housing 12. The fan 43 is arranged so that the light source 14 is directly exposed to the cooling air, the fan 44 is arranged so that the power supply 38 is directly exposed to the cooling air, and the fan 45 is arranged so that the ballast 28 is directly exposed to the cooling air.

An exhaust fan 46 is arranged on the side of the housing 12. Basically, the intake fans 42R, 42G and 42B are arranged at one end of the housing 12, and the exhaust fan 46 is arranged at the other end of the housing 12, so that the cooling air flows from one end to the other in the housing 12. The cooling air introduced into the housing 12 by the intake fans 42R, 42G and 42B cools the light valves 20 and the polarizers 21, and thereafter, a part of the cooling air is sucked by the fans 43, 44 and 45 to cool the light source 14, the power supply 38 and the ballast 40, after which the cooling air is exhausted out of the housing 12 by the exhaust fan 46. The remaining air, after cooling the light valves 20 and the polarizers 21, is exhausted out of the housing 12 directly by the exhaust fan 46.

The fan 43 is arranged on the side of the light source 14 far from the exhaust fan 46, the fan 44 is arranged on the side of the power supply 38 far from the exhaust fan 46, and the fan 45 is arranged on the side of the ballast 40 far from the exhaust fan 46. The light source 14, the power supply 38 and the ballast 40 are arranged radially about the exhaust fan 46, so that no member blocking the flow of the cooling air is arranged between the light source 14, the power supply 38 and the ballast 40 on the one hand and the exhaust fan 46 on the other. Thus, the cooling air increased in temperature by cooling the light source 14, the power supply 38 and the ballast 40 is discharged out of the housing 12 by the exhaust fan 46 without convection in the housing 12.

Figure 6:
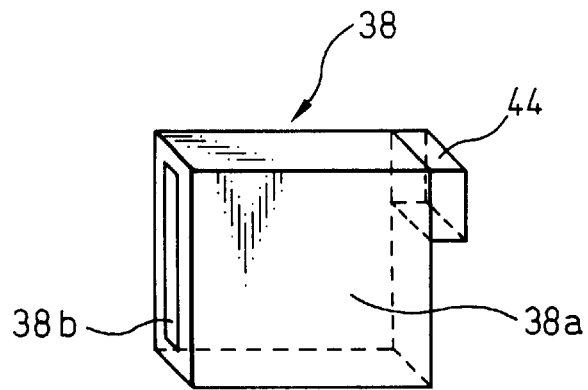
FIG. 6 is a perspective view showing the power supply of FIG. 1.
Figure 7:
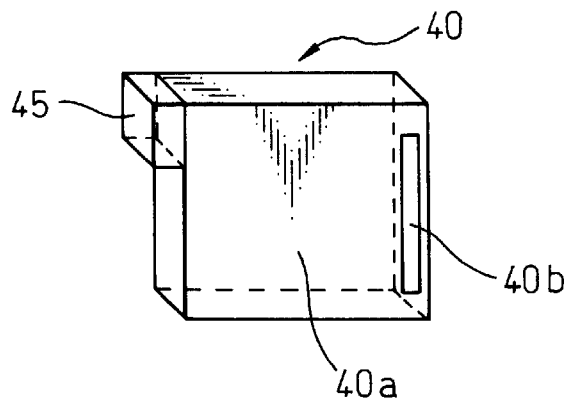
FIG. 7 is a perspective view showing the ballast of FIG. 1.

The power supply 38 includes a cylindrical case 38a as shown in FIG. 6, the fan 44 is arranged at one end of the case 38a, and an exhaust port 38b is arranged at the other end of the case 38a. The exhaust port 38b is directed toward the exhaust fan 46. Since the cooling air flows in the case 38a, the power supply 38 is efficiently cooled. The ballast 40, as shown in FIG. 7, includes a cylindrical case 40a, the fan 45 is arranged at one end of the case 40a, and an exhaust port 40b is arranged at the other end of the case 40a. The exhaust port 40b is directed toward the exhaust fan 46. Since the cooling air flows in the case 40a, the ballast 40 is efficiently cooled. Further, the light source 14 is encased in the lamp house 17, and the cooling air flows in the lamp house 17, so that the light source 14 is efficiently cooled. The lamp house 17 has an exhaust port 60, which is directed toward the exhaust fan 46.

In the configuration described above, fresh air is forcibly blown up in the housing 12 by the intake fans 42R, 42G and 42B, thereby cooling the light valves 20R, 20G and 20B and the polarizers 21 heated by the light absorption. The intake fans 42R, 42G and 42B are configured with sirocco fans, which are, comparatively, not easily affected by air resistance, so that the capacity required for the cooling even from the bottom of the apparatus can be ensured. Also, since the openings 12p and 12r are formed in the apparatus bottom, the noise of the intake fans 42R, 42G and 42B does not easily reach the viewers of the projection image. The viewers thus are not bothered by the apparatus noise. Also, since the fans 43, 44 and 45 are arranged in the housing 12, the apparatus is not noisy.

The light source 14, the power supply 38 and the stabilizer 40 have dedicated fans 43, 44 and 45, respectively. Each of the fans 43, 44 and 45 is designed and adjusted to assure the required cooling capacity in accordance with the individual heat generating amount, the shape and the arrangement within the apparatus, of the light source 14, the power supply 38 and the stabilizer 40, thereby improving the thermal reliability.

In order to exhaust the all the air in apparatus, only one exhaust fan 46 is arranged on the side of the apparatus. This fan 46 has a large capacity and is capable of exhausting all the air from the apparatus. Also, since the exhaust fan 46 is installed on the side of the apparatus, the noise of the exhaust fan 46 does not easily reach the ears of the viewers behind the apparatus.

Among these fans, the intake fans 42R, 42G and 42B are identical to each other, and are configured with 97 mm square sirocco fans. The fan 43 for the light source 14 is configured with a 75 mm square sirocco fan, and the fans 44 and 45 of the power supply 38 and the stabilizer 40 are configured with 50 mm square axial flow fans. The exhaust fan 46 is a 120 mm square axial flow fan.

The intake opening 12p of the apparatus is as large as about 20×20 cm, and the total area of the intake ports 42i of the three intake fans 42R, 42G and 42B is smaller than that of the intake opening. This is related to the filter 49, so that the intake opening 12p is made greater to reduce air resistance in the intake opening 12p and the sufficient amount of the cooling air is smoothly supplied into the apparatus, on the one hand, and the velocity of the cooling air entering the intake opening 12p is reduced so as not to cause a noise such as a wind noise of the cooling air, on the other hand.

The filter 49 keeps dust from entering the apparatus by way of the intake opening 12p. This filter 49 (Bridgestone's Everlight HR 50, 5 mm thick, for example) can remove 80% or more of the dust of 5 $\mu$m or larger. Thus, the situation is prevented in which dust enters the light path of the optical system and is displayed in the projected image thereby deteriorating the display quality, or the light amount is reduced deteriorating the display quality.

The filter 49 is spaced apart from the intake fans 42R, 42G and 42B by 10 mm, so that the resistance of the intake fans 42R, 42G and 42B can be reduced and the fan capacity of 95% or more of the catalog value (for resistance zero) can be secured, thus making it possible to suppress the noise of the fan.

The cooling air is introduced from the intake opening 12p, and passes through the filter 49, cools the light valves 20R, 20G and 20B and the polarizer 21 by the action of the intake fans 42R, 42G and 42B comprising three sirocco fans. Part of the cooling air then flows directly to the exhaust fan 46, while the other of the cooling air is sucked by the fans 43, 44 and 45 of the light source 14, the power supply 38 and the stabilizer 40, respectively, thereby cooling the light source 14, the power supply 38 and the stabilizer 40, and is finally sucked by the exhaust fan 46. The outlets of the cooling air exhausted from the light source 14, the power supply 38 and the stabilizer 40a are concentrated in the vicinity of the exhaust fan 46, so that the warmed cooling air is positively exhausted without recirculating in the apparatus. As a result, the amount of the cooling air is above the required minimum, and the air is not forcibly moved by increasing the fan speed, and thus the noise is minimized.

In the light source 14 for which the distance between the exhaust port 60 and the exhaust fan 46 is greater, compared with the power supply 38 and the stabilizer 40, a duct is provided on the exhaust side to shorten the distance from the exhaust fan 46. By shortening the distance from the exhaust fan 46, the apparatus can be efficiently cooled without recirculating the warmed cooling air in the apparatus.

The exhaust capacity of the apparatus is substantially the same as the intake capacity thereof. By positively exhausting the cooling air taken in by way of a plurality of sirocco fans, a smooth flow of the cooling air is realized.

Figure 9A:
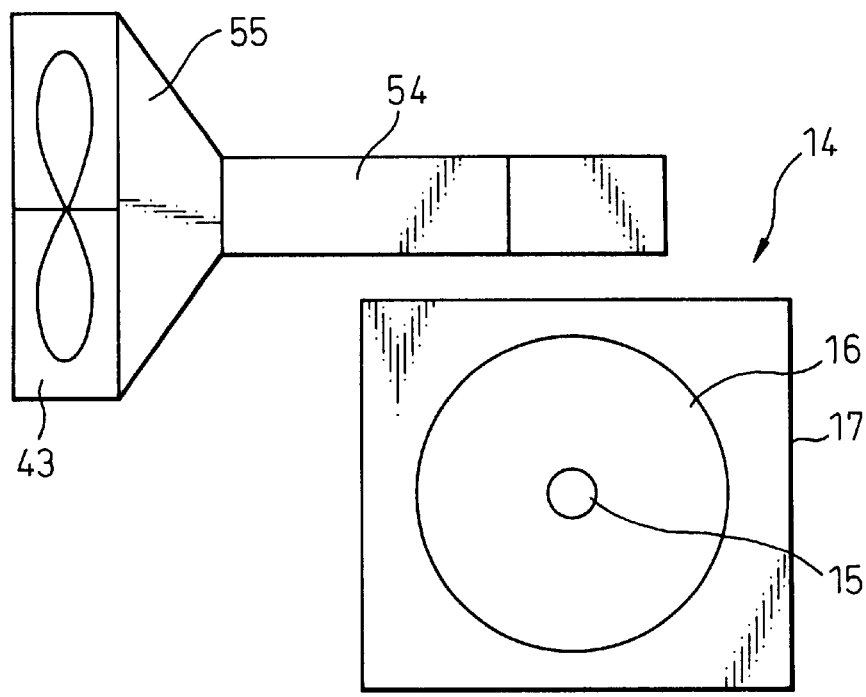
FIG. 9A is a front view showing a lamp house and a duct for explaining the cooling means for the light source according to the second embodiment of the invention.
Figure 9B:
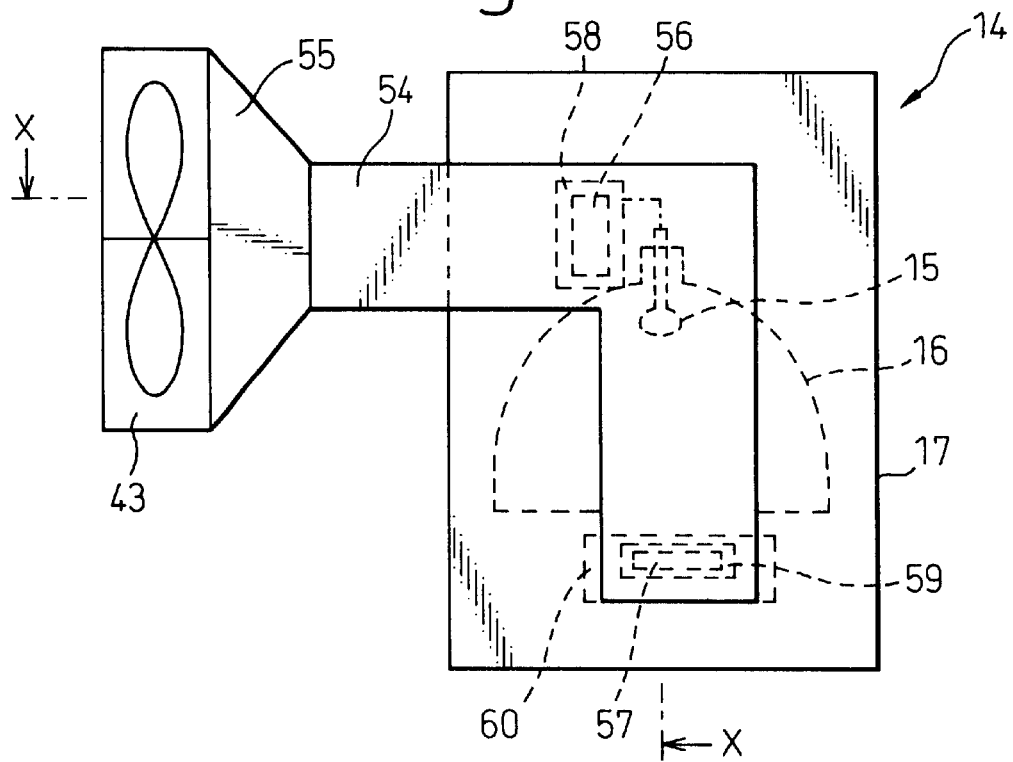
FIG. 9B is a plan view of the lamp house and the duct of FIG. 9A.
Figure 10:
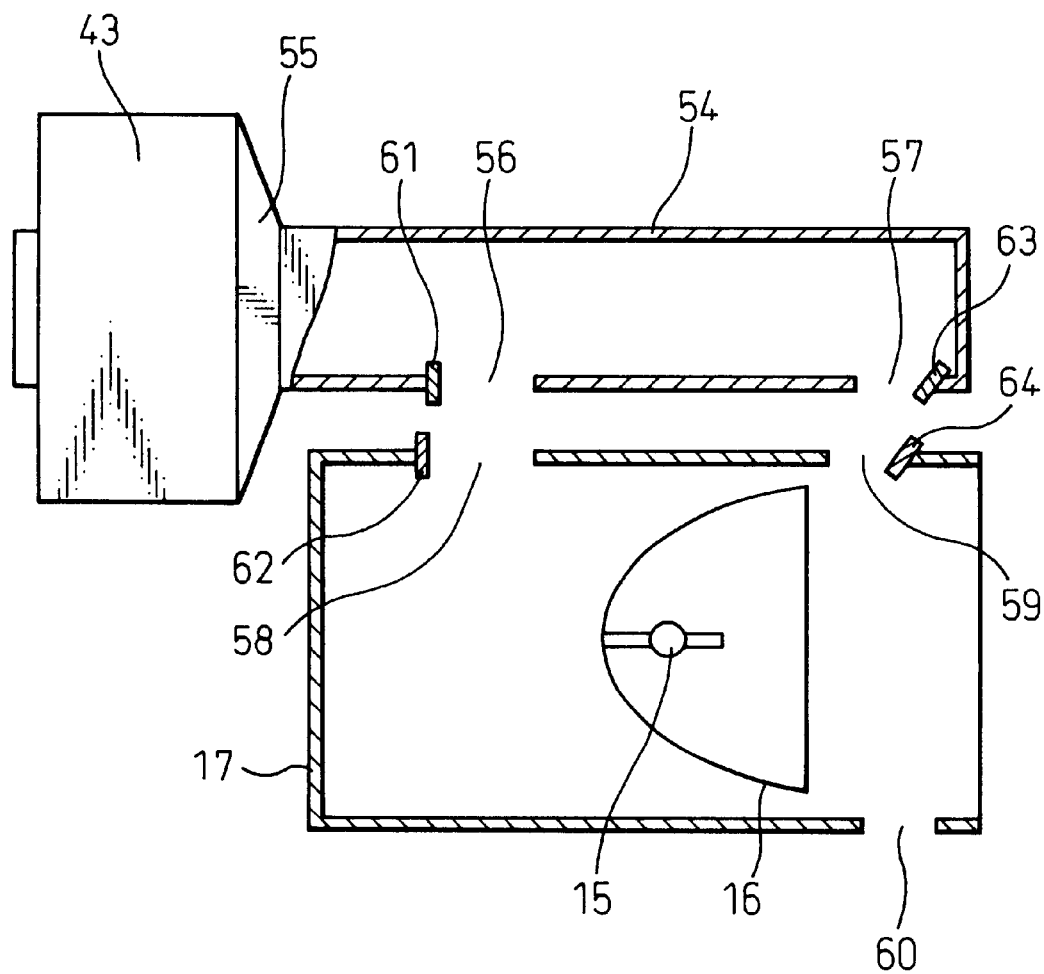
FIG. 10 is a cross-sectional view of the lamp house and the duct of FIGS. 9A and B taken in line X—X in FIG. 9B.

FIGS. 9A to 10 are views explaining the projection type display apparatus 10 comprising the cooling unit for the light source 14 according to the second embodiment of the present invention. The cooling unit for the light source 14 described below is directly applicable to the light source 14 of the projection type display apparatus 10 of FIG. 1. The cooling unit of the light source 14 can be also applied also to the light source of the projection type display apparatus having a different configuration.

The light source 14 includes the lamp 15, the parabolic reflector 16 and the lamp house 17, as described above. The lamp 15 can be a metal halide lamp. The cooling unit for the light source 14 includes the fan 43 arranged in the housing 12 of the projection type display apparatus (FIG. 1), and a duct 54 for leading the cooling air from the fan 43 to the lamp house 17. The fan 43 is an axial flow fan or a sirocco fan.

FIG. 9A is a front view of the lamp house 17 and the duct 54, and FIG. 9B is a plan view of the lamp house 17 and the duct 54. FIG. 10 is a cross-sectional view of the lamp house 17 and the duct 54 taken in line X—X in FIG. 9B.

The lamp house 17 is arranged with a slight space between the duct 54 and the lamp house 17 so that the lamp house 17 may be movable with respect to the duct 54. Thus, the lamp house 17 can be moved with respect to the housing 12 in order to replace the light source 14. In this example, the fan 43 is arranged at a position diagonally upward of the lamp house 17. The duct 54 is arranged above the lamp house 17, extends transversely of the center axis of the lamp house 17 from the fan 43 and, turning by 90 degrees midway, further extends in parallel to the center axis of the lamp house 17.

The duct 54 includes an air inlet 55 for introducing the air from the fan 43, a first air outlet 56 and a second air outlet 57. The first air outlet 56 is located at an intermediate point of the duct 54, and the second air outlet 57 is located at the distal end of the duct 54. The first air outlet 56 and the second air outlet 57 are formed in the bottom wall of the duct 54 in a rectangular cross-section.

The lamp house 17 includes a first air inlet 58, a second air inlet 59 and the exhaust port 60. The first air inlet 58 and the second air inlet 59 are located at the top wall of the lamp house 17, while the exhaust port 60 is located in the bottom wall of the lamp house 17. The first air inlet 58 of the lamp house 17 is located at a position corresponding to the first air outlet 56 in such a manner as to introduce the cooling air from the first air outlet 56 of the duct 54, and the second air inlet 59 is located at a position corresponding to the second air outlet 57 for introducing the cooling air from the second air outlet 57 of the duct 54. The cooling air flows from top downward in the lamp house 17.

As shown in FIG. 10, the first air inlet 58 of the lamp house 17 is arranged in such a manner as to blow the cooling air to the rear side of the reflector 16. In this case, the cooling air is not brought into direct contact with the lamp 15, and therefore has a small effect of cooling the lamp 15. Nevertheless, the cables and the like (not shown) located on the rear side of the reflector 16 are cooled and the overheating of the cables and the like is thus prevented, thereby assuring the safe operation of the apparatus. In fact, it is more desirable to cool the cables and the like arranged on the rear side of the reflector 16, with an increase in the amount of light.

The second air inlet 59 of the lamp house 17 is provided to blow the cooling air to the front side of the reflector 16 and thus directly cool the lamp 15. By supplying the cooling air downward from top of the lamp 15, the whole lamp 15 can be efficiently cooled. If the cooling air is supplied from bottom up in the lamp, in contrast, the upper side of the lamp cannot be effectively cooled. In this embodiment, the cooling air is blown to the front side and the rear side of the reflector 16 and thus a better operation of the light source 14 is assured.

Since the lamp house 17 is movable, the first air outlet 56 of the duct 54 is not continuous with the first air inlet 58 of the lamp house 17, so part of the cooling air leaks out from the gap between the duct 54 and the lamp house 17. In view of this, fins 61 and 62 are arranged as flow control member at the first air outlet 56 of the duct 54 and the first air inlet 58 of the lamp house 17, respectively, in order to reduce the leakage of the cooling air, thereby increasing as much as possible the cooling air flowing from the first air outlet 56 of the duct 54 to the first air inlet 58 of the lamp house 17. In a similar fashion, fins 63 and 64 are arranged as flow control members at the second air outlet 57 of the duct 54 and the second air inlet 59 of the lamp house 17, respectively. However, all the fins 61, 62, 63 and 64 are not necessarily included, as shown by embodiments later.

The fins 61, 62, 63 and 64 extend outward of the duct 54 and the lamp house 17, and preferably compensate for the discontinuity between the path of the lamp house 17 and the path of the duct 54 when the lamp house 17 is arranged at a predetermined position with respect to the duct 54. Also, the fins 61, 62, 63 and 64 partly extend into the duct 54 and the lamp house 17 so that the flow of the cooling air proceeds toward the lamp house 17 from the duct 54.

The capacity and the direction of the air blown above the lamp 15 are adjusted, so that the upper part of the lamp 15 can be set to an arbitrary temperature. Also, the use of the fan 43 of sirocco type and the duct 54 makes a compact cooling mechanism. The cooling of the rear side of the reflector 17 can be arbitrarily adjusted according to the size of the first air outlet 56 arranged midway of the duct 54 and the size and angle of the fin 61 arranged there.

Figure 11A:
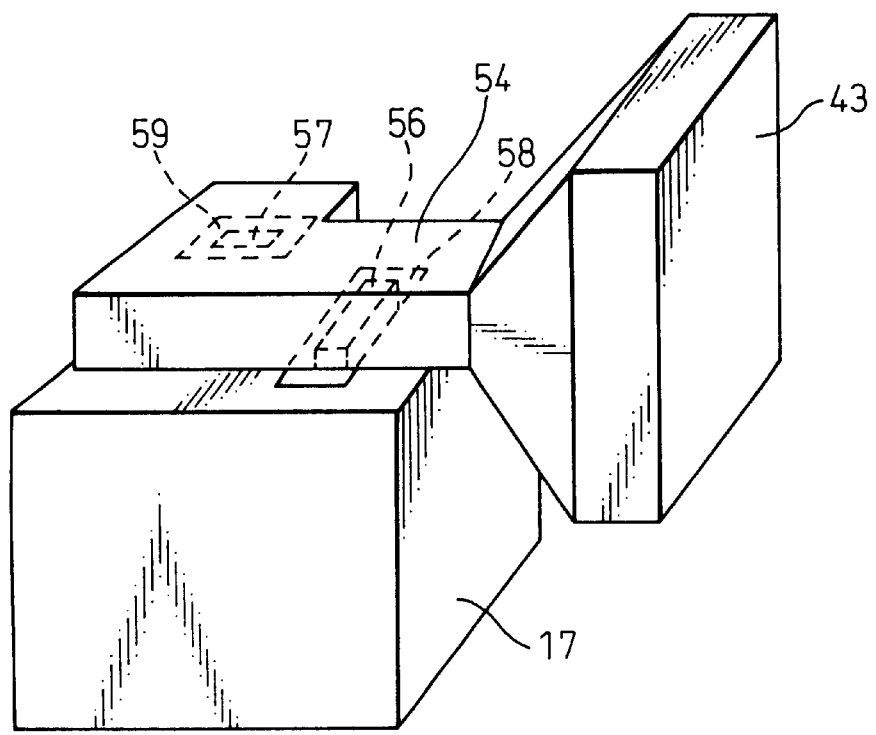
FIG. 11A is a perspective view showing another example of the cooling unit for the light source.
Figure 11B:
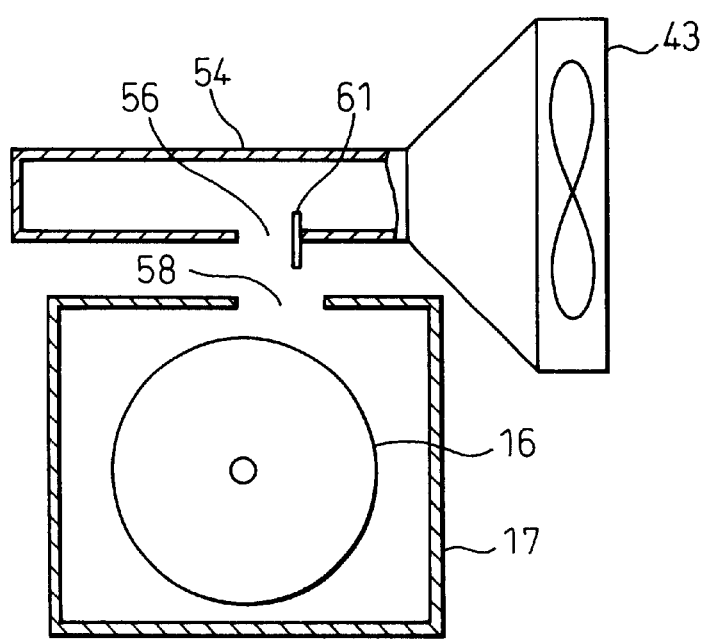
FIG. 11B is a cross-sectional view of the cooling unit of FIG. 11A.

FIG. 11A is a perspective view showing another example of the cooling unit for the light source 14, and FIG. 11B is a cross-sectional view of the cooling unit for the light source 14 shown in FIG. 11A. In this example, the first air outlet 56 arranged midway of the duct 54 is provided with the fin 61 protruded into and outward of the duct 54 in a position perpendicular to the duct. This fin 61 makes it possible to adjust the capacity of the air flowing out to the rear side of the reflector 16 and the angle of blow thereof. In the shown case, the fin 61 is protruded into the duct by about 30% of the height of the duct 54, and the fin 61 is also protruded outward of the duct 54 by a height almost equal to the interval between the lower side of the duct and the upper surface of the lamp house. As a result of this structure, the amount of air blown from the first air outlet 56 of the duct 54 can be increased. By the way, the amount of extension of the fin 61 into the duct 54, the amount of protrusion of the duct out of the duct 54 and the angle of the fin 61 are not limited to the conditions described above but can be arbitrarily selected.

Figure 12:
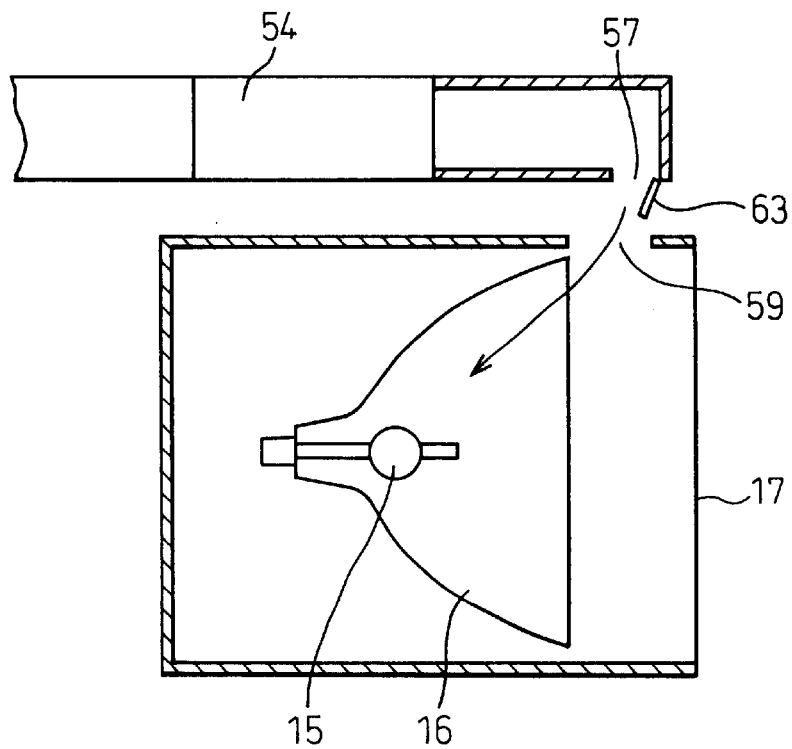
FIG. 12 is a cross-sectional view showing another example of the cooling unit for the light source.

FIG. 12 is a cross-sectional view showing another example of the cooling unit for the light source 14. In this example, the fin 63 arranged at the second air outlet 57 of the duct 54 has an angle and a size determined so that the cooling air blown from the duct 54 comes into contact with the vicinity of the light emitting tube of the lamp 15 as shown by arrow. This fin 63 causes the cooling air blown out of the duct 54 to flow toward the valve of the lamp 15. As a result, the lamp 15 can be set to a temperature that can maintain the reliability of the lamp 15.

Figure 13:
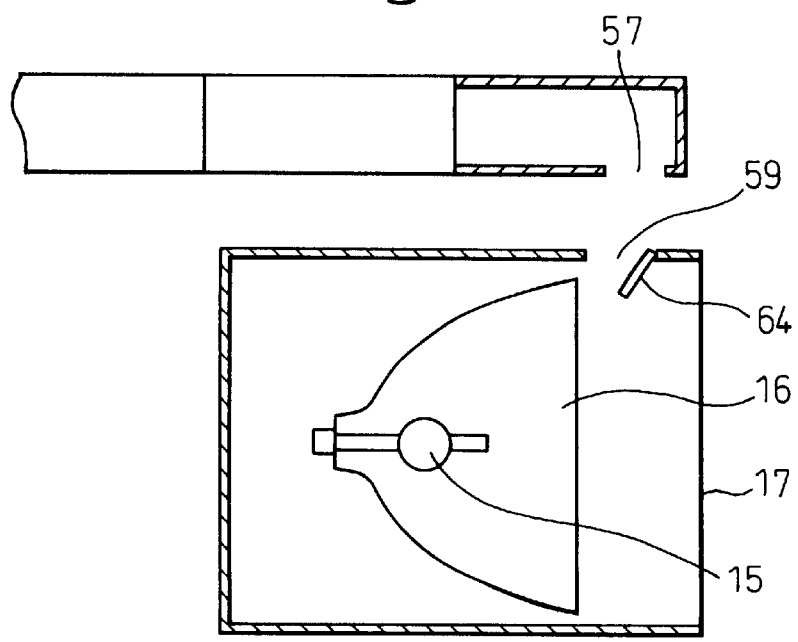
FIG. 13 is a cross-sectional view showing another example of the cooling unit for the light source.

FIG. 13 is a cross-sectional view showing another example of the cooling unit for the light source 14. In this example, the fin 64 arranged at the second air inlet 59 of the lamp house 17 has an angle and a size thereof adjusted so that the cooling air blown out of the duct 54 comes into contact with the vicinity of the light emitting tube of the lamp 15. This fin 64 causes the cooling air blown out of the duct 54 and entering the second air inlet 59 of the lamp house 17 to set the lamp 15 at a temperature which maintains the reliability of the lamp 15.

Figure 14A:
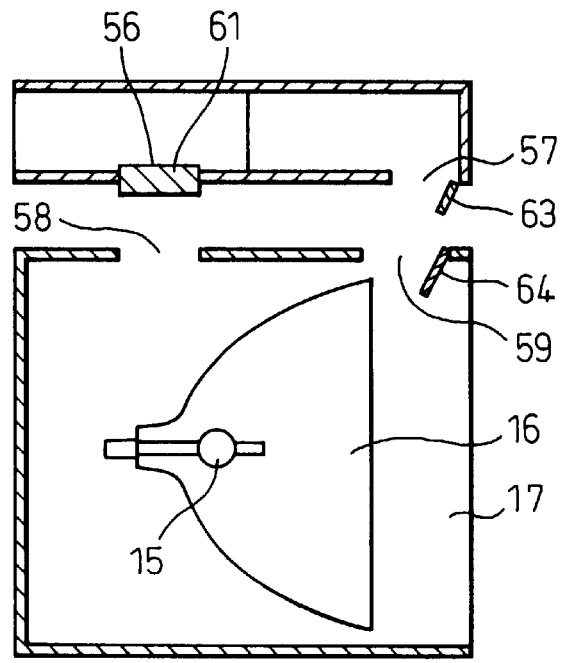
FIG. 14A is a cross-sectional view showing another example of the cooling unit for the light source.
Figure 14B:
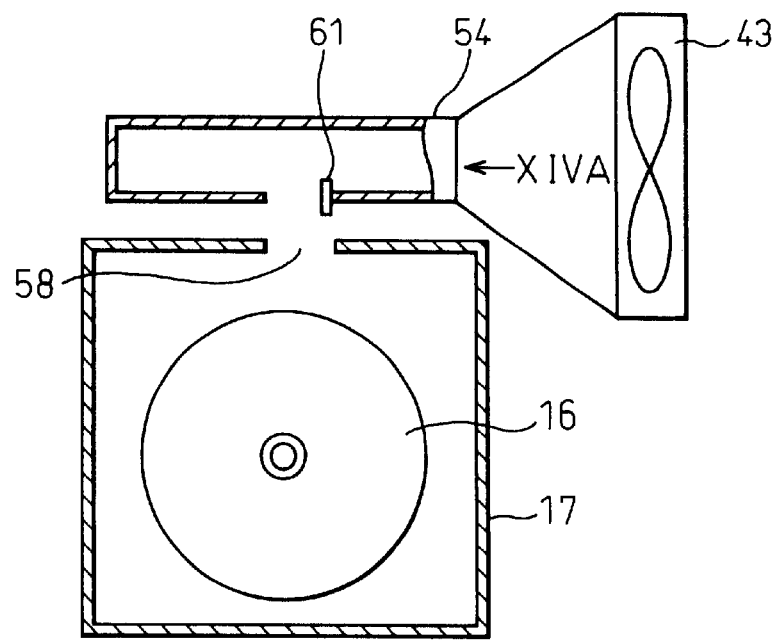
FIG. 14B is a cross-sectional view of the cooling unit of FIG. 14A.

FIGS. 14A and 14B are sectional views showing another example of the cooling unit for the light source 14. The fin 61 in FIG. 14A is taken in the direction of arrow XIVA of FIG. 14B. This example has a configuration of the embodiments of FIGS. 11 to 13 combined and achieves all the effects of the embodiments at the same time. When emphasizing the cooling of the lamp house 17, the embodiments of only FIGS. 12 and 13 may be combined. In this configuration, the cooling air flowing to the rear side of the reflector 16 is inferior to the corresponding flow in FIG. 11, but a simpler structure of the duct 54 can be obtained.

Figure 15:
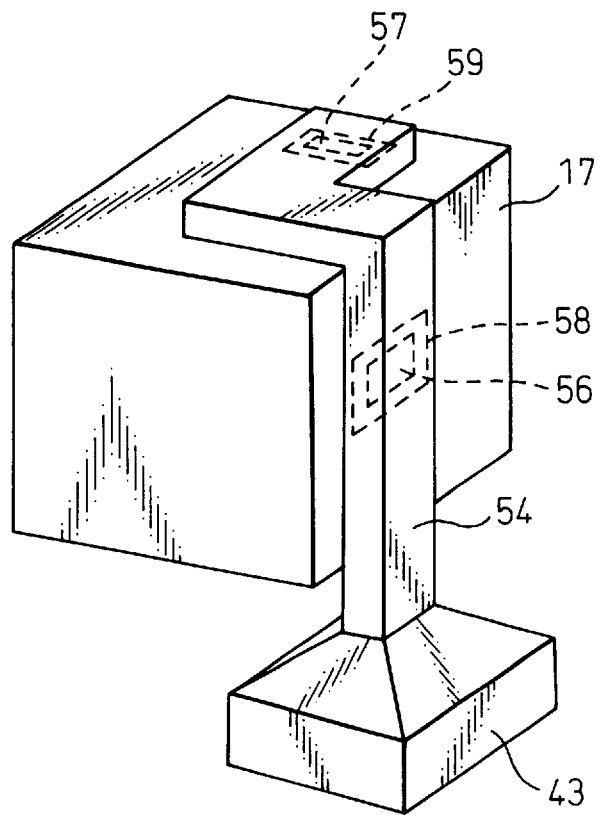
FIG. 15 is a perspective view showing another example of the cooling unit for the light source.

FIG. 15 is a perspective view showing another example of the cooling unit for the light source 14. In the embodiments of FIGS. 9 to 14, the duct 54 is arranged above the lamp house 17 with the lamp installed, and the cooling air is adapted to flow top down along the lamp 15 and the reflector 16. In the case under consideration, on the other hand, at least a part of the duct 54 is arranged beside the lamp house 17 so that the cooling air flows horizontally. The first air outlet 56 and the first air inlet 58 are formed in the side walls of the duct 54 and the lamp house 17. The second air outlet 57 and the second air inlet 59 are formed in the top walls of the duct 54 and the lamp house 17. Further, the fins 61, 62, 63 and 64 can be arranged appropriately.

Figure 16:
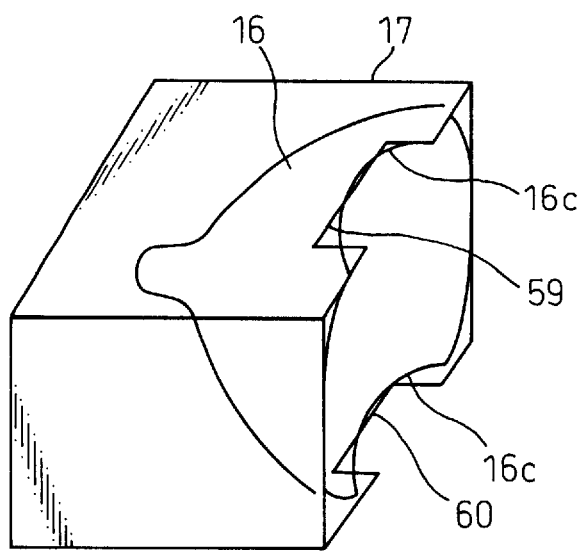
FIG. 16 is a perspective view showing another example of the cooling unit for the light source.
Figure 17:
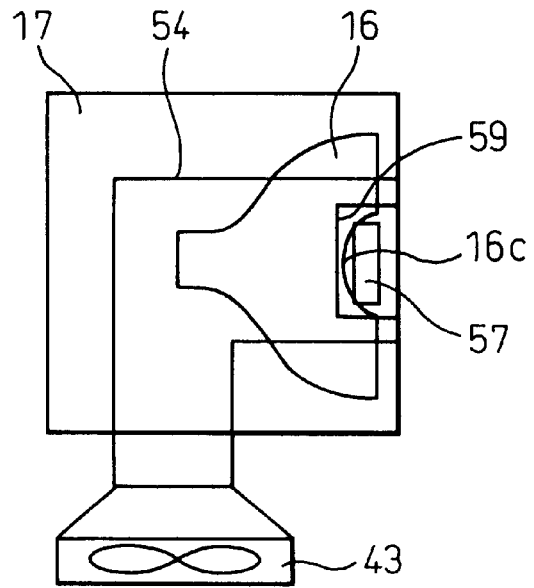
FIG. 17 is a plan view illustrating the ducts and the lamp house of the apparatus shown in FIG. 16.

FIG. 16 is a perspective view showing another example of the cooling unit for the light source 14, and FIG. 17 is a diagrammatic plan view illustrating the duct and the lamp house of the apparatus shown in FIG. 16. In FIG. 16, the duct 54 is not shown. The reflector 16 is a parabolic reflector, as an example, and with the lamp installed thereon, the upper and lower parts of the outer peripheral portion of the reflector 16 are cut. The cut parts are designated by 16c. The portions of the lamp house 17 corresponding to the cut parts 16c of the reflector 16 form the second air inlet 59 and the exhaust port 60, respectively. The air outlet 57 of the duct 54 is located at a position corresponding to the cut part 16c of the reflector 16. As a result, the cooling structure of the light source 14 is reduced in size. By the way, the cut parts, which are formed at the upper and lower positions in this example, can alternatively be formed in the outer peripheral portion of the reflector with equal effect of reducing the size.

Figure 18:
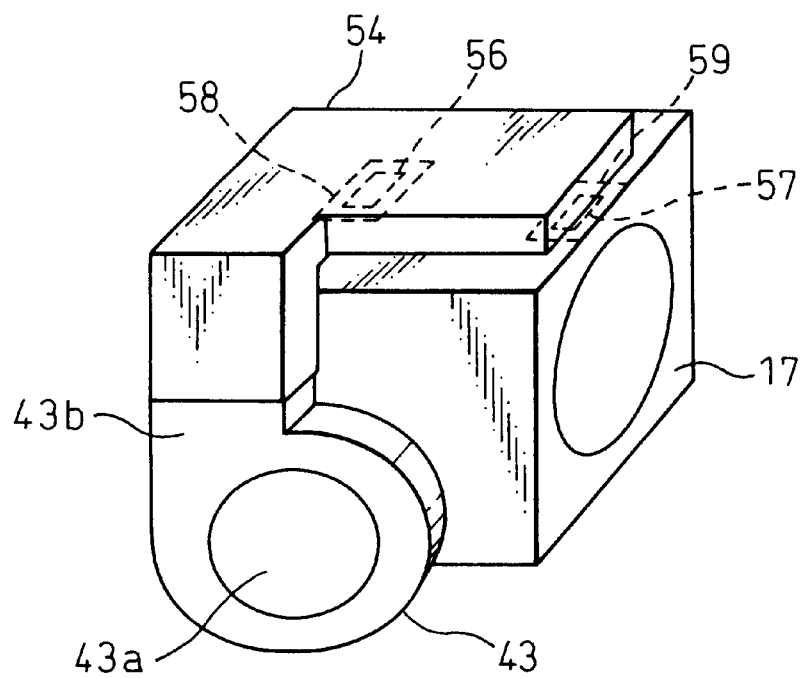
FIG. 18 is a perspective view showing another example of the cooling unit for the light source.

FIG. 18 is a perspective view showing another example of the cooling unit for the light source 14. The cooling fan 43 is a sirocco fan. The sirocco fan has an air inlet 43a and an air outlet 43b. The air outlet 43b of the sirocco fan is smaller than that of the axial flow fan, and is accompanied by a smaller duct 54. In addition, the sirocco fan has a higher static pressure characteristic than the axial flow fan, and therefore even in the case where the duct 54 is complicated, the amount of the cooling air required for cooling the lamp 15 can be secured more easily. In the configuration shown in FIGS. 9 to 17, the sirocco fan can be used for all the cooling fans 43.

Figure 19:
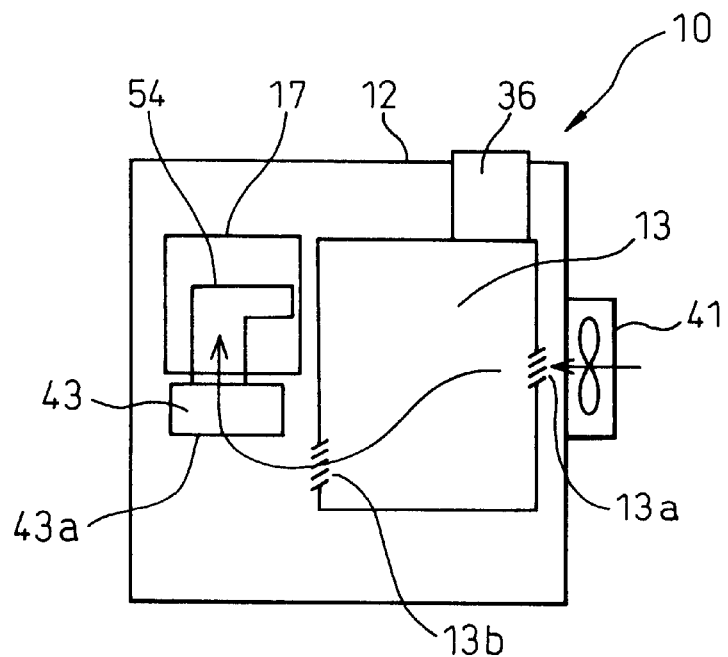
FIG. 19 is a plan view for illustrating another example of the cooling unit for the light source.

FIG. 19 is a plan view showing another example of the cooling unit for the light source 14. The light source 14 and the cooling unit therefor are arranged, for example, in the projection type display apparatus 10. The projection type display apparatus 10 can be one as shown in FIG. 1 or can be configured another way. The projection type display apparatus 10 includes an optical unit 13, which in turn has optical members (such as the light valves and so on). The projection type display apparatus 10 includes an intake unit 41, and the optical unit 13 has an intake unit 13a and an exhaust unit 13b, so that the cooling air flows as indicated by arrow. The intake unit 43a of the fan 43 of the cooling unit for the light source 14 is arranged against the flow of the cooling air. Thus, the interior of the apparatus is cooled, the high-temperature cooling air is absorbed by the fan 43 of the cooling unit for the light source 14, the lamp 15 is cooled, and the cooling air is exhausted out of the apparatus by the exhaust fan of the whole cooling unit further increased in temperature.

Figure 20:
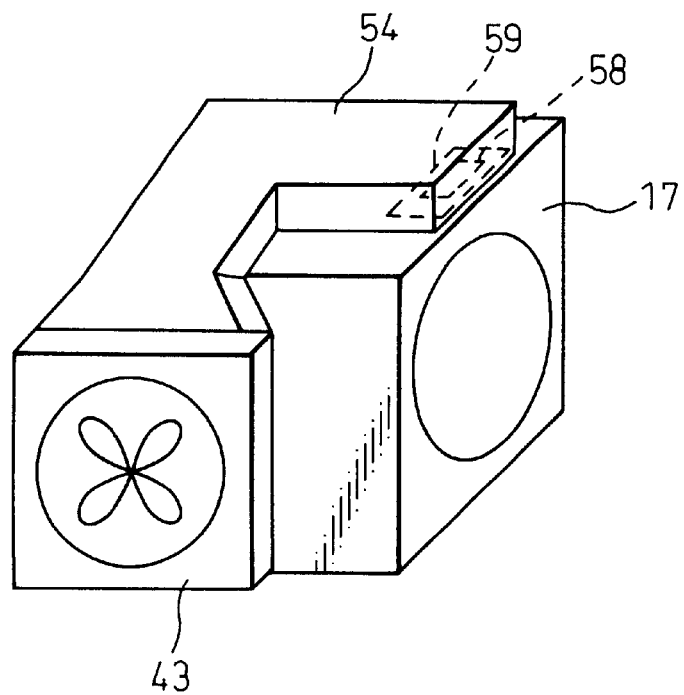
FIG. 20 is a perspective view showing another example of the cooling unit for the light source.
Figure 21:
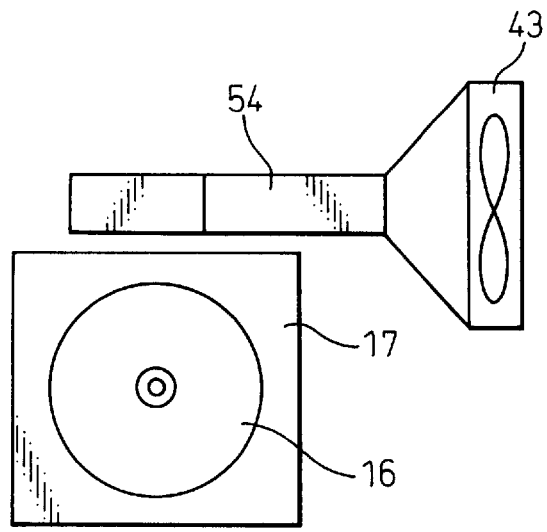
FIG. 21 is a rear view of the cooling unit for the light source of FIG. 20.
Figure 22:
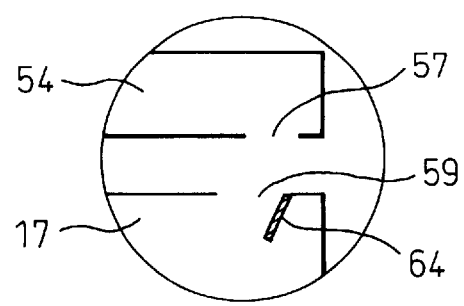
FIG. 22 is a view showing the air outlet and the air inlet of the duct and the lamp house shown in FIG. 20.

FIGS. 20 to 22 show another example of the cooling unit for the light source 14. The metal halide lamp 15 fixed on the parabolic reflector 16 is built in the lamp house 17. The air inlet 59 and the exhaust port 60 are formed on the upper and lower sides of the lamp house 17. The axial flow fan 43 is arranged beside the lamp house 17, and the duct 54 supplies the cooling air to the lamp house 17 from the outlet of the axial flow fan 43. The cooling air inlet 59 of the lamp house 17 is provided with the fin 64. The angle and the size of the fin 64 are determined so that the cooling air blown out of the duct 54 comes into contact with the vicinity of the light emitting tube of the lamp 15. This fin 64 causes the cooling air blown out of the duct 54 to flow toward the bulb of the lamp 15. Thus, the lamp 15 can be held at such a temperature as to maintain the reliability thereof. The cooling operation of the lamp can also be adjusted by selecting the fan and regulating the fan drive voltage in such a manner as to secure the proper amount of the cooling air blown out to the front side of the reflector 17 from the cooling air inlet 59 of the lamp house 17 and the proper lamp temperature.

Figure 23:
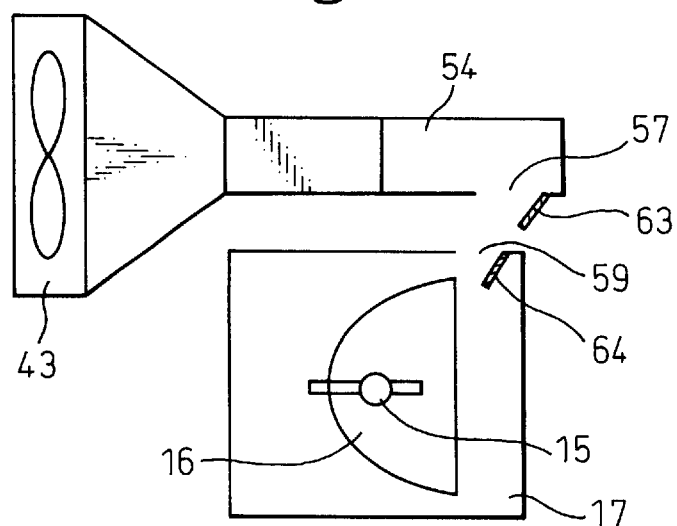
FIG. 23 is a view showing another example of the cooling unit for the light source.

FIG. 23 shows another example of the cooling unit for the light source 14. As compared with the embodiments shown in FIGS. 20 to 22, the embodiment under consideration is such that the fin 63 is arranged at the second air outlet of the duct 54 and the fin 64 is arranged at the second air inlet of the lamp house 17. The angle and the size of the fins 63 and 64 can be adjusted to facilitate the entry of the cooling air into the cooling air inlet 59 of the lamp house 17. The duct opening, which is arranged above the light source installed as shown in this diagram, may alternatively be located beside the light source.

Figure 24:
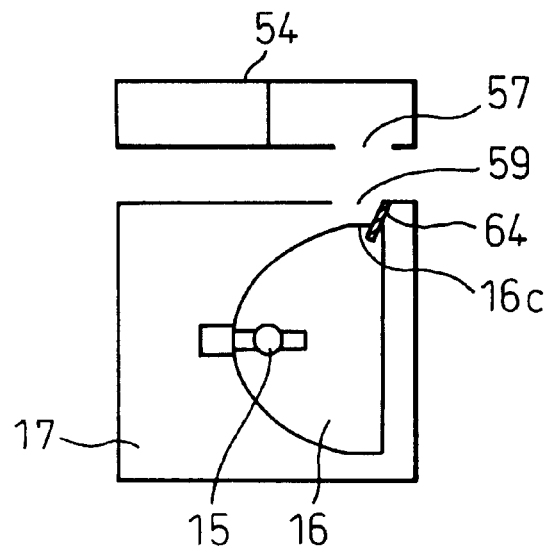
FIG. 24 is a side view showing another example of the cooling unit for the light source.
Figure 25:
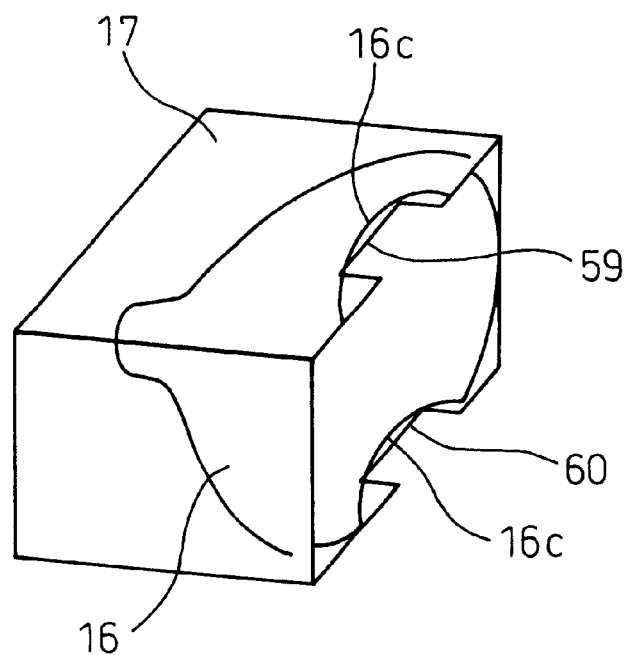
FIG. 25 is a perspective view showing the cooling unit for the light source of FIG. 24.

FIGS. 24 and 25 show another example of the cooling unit for the light source 14. As compared with the embodiment of FIGS. 20 to 22, a part of the peripheral portion of the reflector 16 is cut. In these diagrams, upper and lower parts are cut. A cooling air inlet 59 and an exhaust port 60 for the lamp house 17 are formed at positions corresponding to the cut parts 16c of the reflector 16. As a result, the mechanical size of the light source 14 can be reduced as compared with the case of FIGS. 20 to 22. Instead of forming the cut parts 16c at upper and lower positions as in this example, the cut parts can be formed at arbitrary positions such as left and right positions or at upper and lateral positions with equal effect of reducing the mechanical size.

Figure 26:
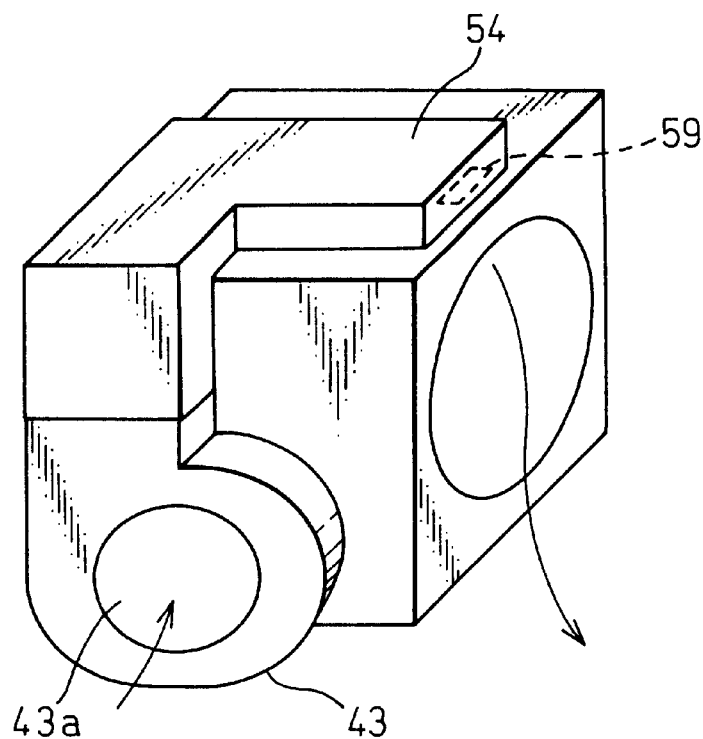
FIG. 26 is a perspective view showing another example of the cooling unit for the light source.
Figure 27:
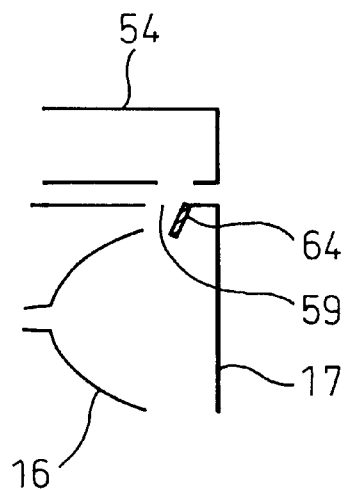
FIG. 27 is a schematic cross-sectional view showing the cooling unit for the light source of FIG. 26.

FIGS. 26 and 27 show another example of the cooling unit for the light source 14. As compared with the embodiments shown in FIGS. 20 to 22, a sirocco fan is used as the cooling fan 43. The use of a sirocco fan reduces the size of the duct. Also, as compared with the axial flow fan, the sirocco fan has a superior static pressure characteristic, and therefore, the amount of the cooling air required for cooling the lamp can be secured more easily.

Figure 28:
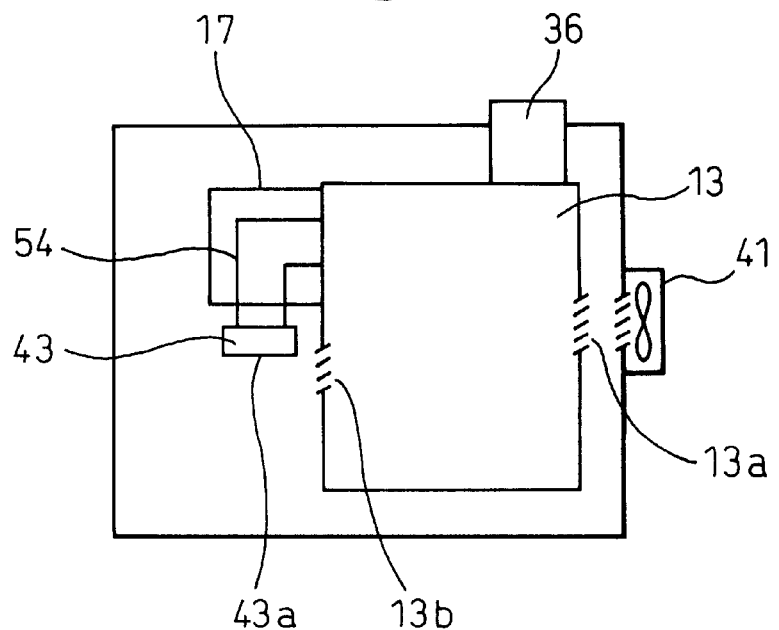
FIG. 28 is a view showing another example of the cooling unit for the light source.

FIG. 28 shows another example of the cooling unit for the light source 14. As compared with the embodiments shown in FIGS. 20 to 22, the light source 14 is arranged in the projection type display apparatus 10. The apparatus is configured so that the cooling air flows in the apparatus as shown, in which the intake air port 43a of the fan 43 is arranged below the flow of the cooling air. Thus, the interior of the apparatus is cooled, and the high temperature cooling air is absorbed by the cooling fan 43 of the light source cooling unit, cools the lamp 15 and is exhausted out of the apparatus, by the exhaust fan for the whole cooling unit, further increased in temperature.

Figure 29:
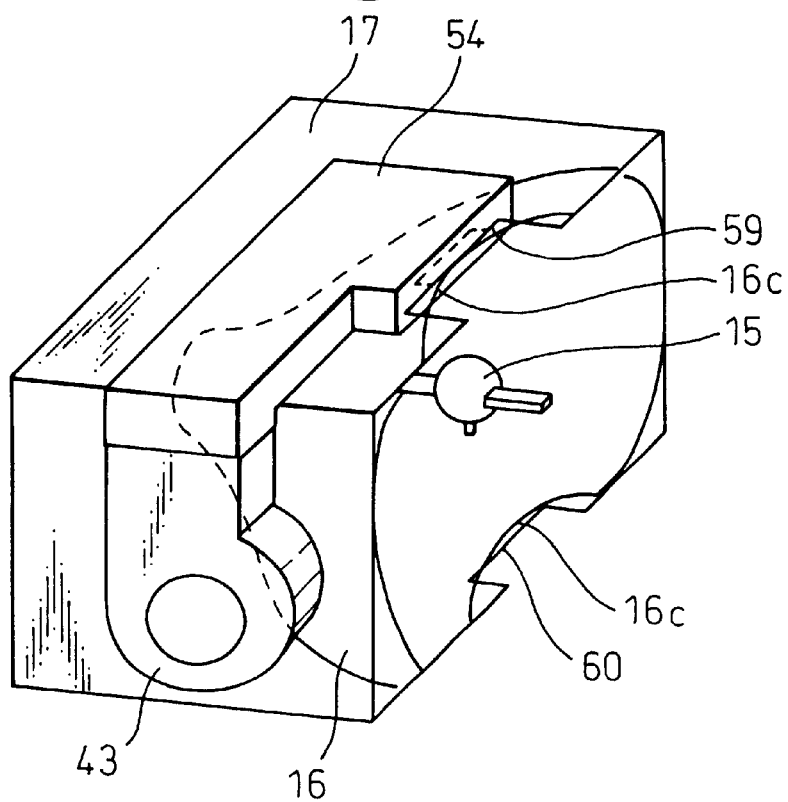
FIG. 29 is a perspective view showing another example of the cooling unit for the light source.
Figure 30:
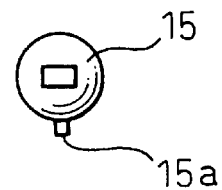
FIG. 30 is a front view showing the lamp portion of FIG. 29.
Figure 31:
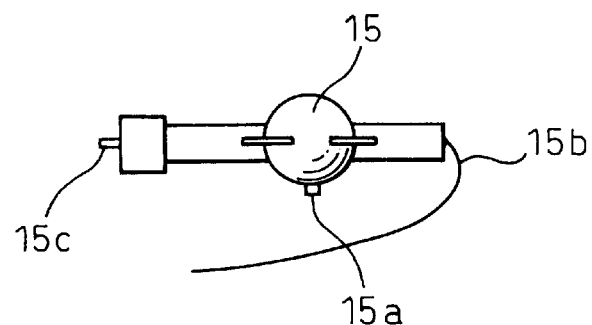
FIG. 31 is a side view showing the lamp portion of FIG. 29.

FIGS. 29 to 31 show another example of the cooling unit for the light source 14. The lamp 15 is a metal halide lamp, and the fan 43 is arranged beside the lamp house 17. The cooling air from the cooling fan 43 passes through the duct 54, and is blown out toward the light emitting tube of the lamp 15 from the cooling air inlet 59 of the lamp house 17 and the cut parts 16c of the reflector. In this case, the position of the bulb is adjusted so that the tip portion 15a of the metal halide lamp 15 is located on the side of the bulb far from the side exposed to the cooling air thus blown out. As a result, the cooling air is kept out of direct contact with the tip portion 15a, and therefore the tip portion 15a is not cooled excessively. If the tip portion 15a is excessively cooled, the light emission efficiency is liable to drop and the display brightness is adversely affected. By the way, numeral 15b designates a negative electrode, and numeral 15c a positive electrode. The intake port 59, which is arranged at the upper part in this embodiment, may alternatively be formed sideways as in the foregoing embodiments, as long as the tip portion 15a is located sideways so that the cooling air may not come into direct contact with the tip portion 15a.

Figure 32:
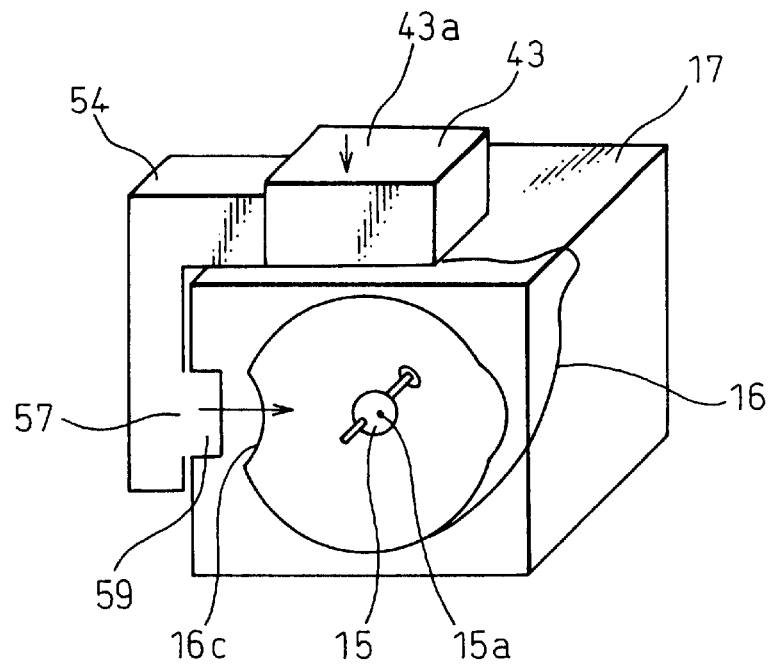
FIG. 32 is a perspective view showing another example of the cooling unit for the light source.

FIG. 32 is a perspective view showing another example of the cooling unit for the light source 14. In the embodiment of FIG. 32, a cut part 16c is formed in the lateral side of the outer peripheral portion of the reflector 16. A cooling air inlet 59 is formed in the vicinity of the cut part 16c. As a result, the size of the light source 14 can be reduced as compared with the configuration of FIGS. 29 to 31.

In all the embodiments described above, the lamp 15 may use a metal halide lamp and the reflector 16 may be configured with a parabolic reflector.

Figure 33:
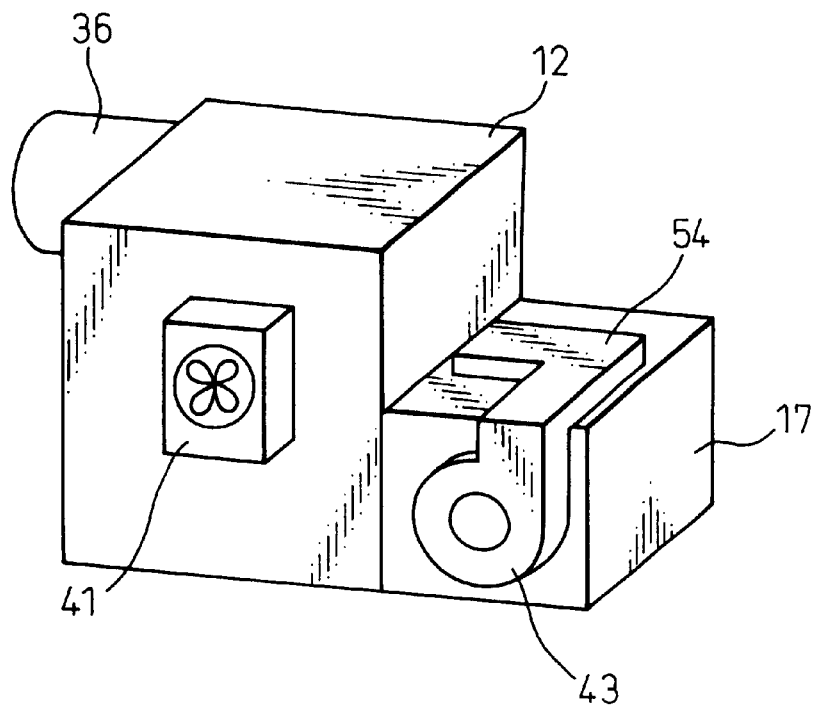
FIG. 33 is a perspective view showing another example of the cooling unit for the light source.
Figure 34:
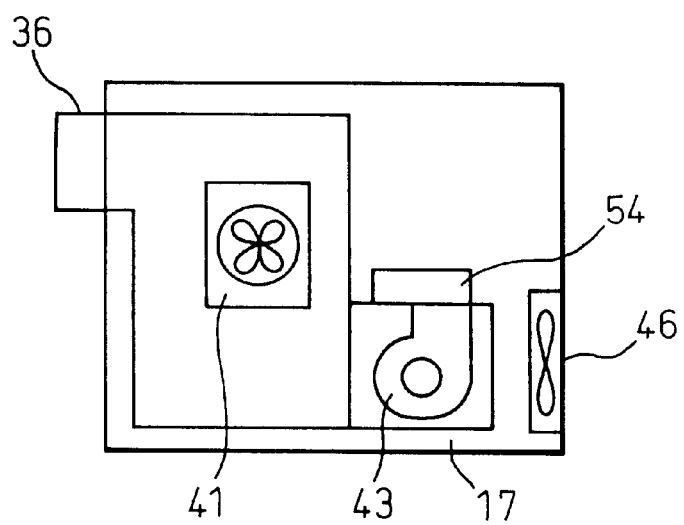
FIG. 34 is a side view showing the cooling unit for the light source of FIG. 33.

FIGS. 33 and 34 show another example of the cooling unit for the light source 14. The lamp 15 is a metal halide lamp, the reflector 16 is a parabolic reflector, and the sirocco fan 43 and the duct 54 make up a cooling unit. An opening for retrieving the cooling air for cooling the rear side of the reflector 16 is arranged midway of the duct 54. This opening is provided with a fin for improving the cooling air retrieval efficiency and adjusting the size and angle of the fin in such a manner as to blow the cooling air to the required point. Another fin is provided in the opening at the forward end of the duct 54. The upper and lower portions of the reflector 16 are cut, where an opening of the lamp house 17 is formed. Also, the opening on the intake side is provided with a duct to assure efficient flow of the cooling air exhausted out of the exhaust opening to the exhaust fan 46 for exhausting the whole apparatus. The projection type display apparatus is configured with the light source 14, the lamp cooling mechanism, the light valve including the color separation unit and the liquid crystal panel, the color synthesizing unit and the projection lens 36.

Also, when replacing, by taking out, the lamp, the duct and fin do not interfere with the other members thereby facilitating the replacement.

Further, in all the embodiments described above, the sizes of the opening area of the air outlet of the duct 54 and the opening of the air inlet of the lamp house 17 are set such that the opening of the air inlet of the lamp house 17 is the same or larger than the opening of the air outlet of the duct 54, so that the cooling air blown out from the duct 54 can be supplied effectively into the lamp house 17.

Figure 35:
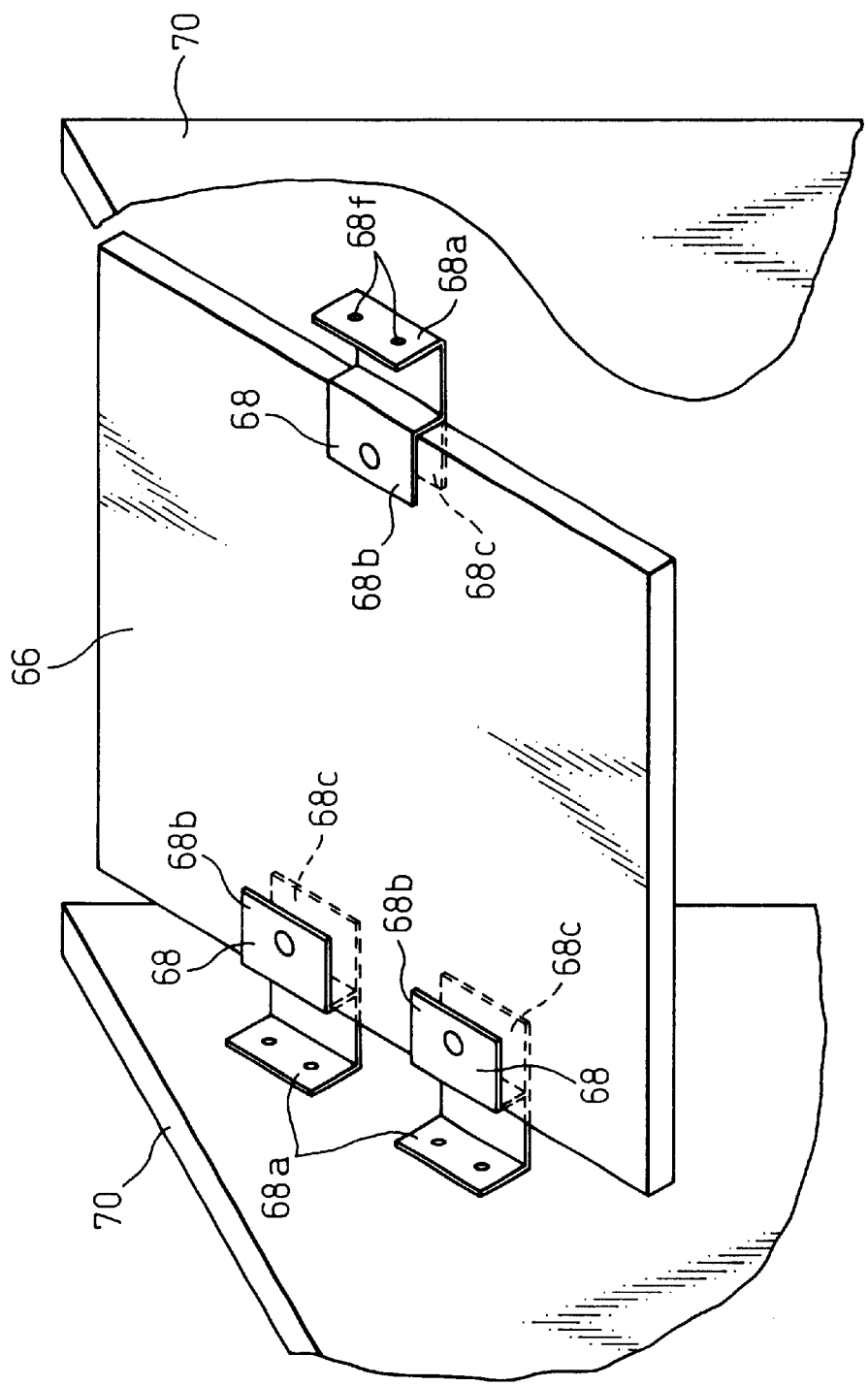
FIG. 35 is a perspective view showing a mirror support unit according to a third embodiment of the invention.
Figure 36A:
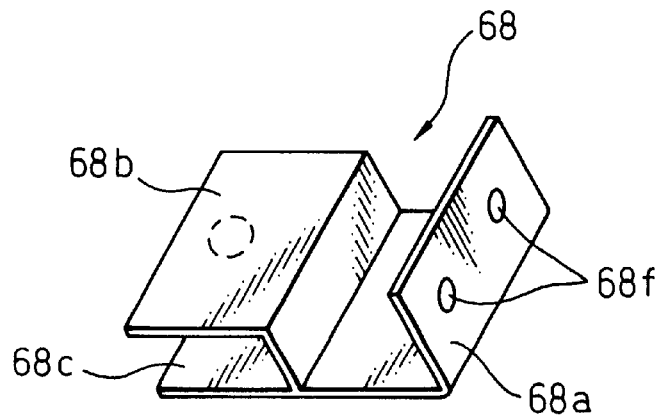
FIG. 36A is a perspective view of the holding member of FIG. 35.

FIGS. 35 and 36A are perspective views showing a mirror support unit according to the third embodiment of the invention. In this embodiment, a mirror 66 is properly supported. The relationship between the mirror 66 and the projection type display apparatus is first explained.

With reference to FIG. 1, the projection type display apparatus 10 comprises a light source 14, three light valves 20R, 20G and 20B, a color separation means 24, a color synthesizing means 30 and a projection lens 36. The light valves 20R, 20G and 20B are formed of liquid crystal panels, for example, for forming red, green and blue images, respectively. The color separation means 24 includes two dichroic mirrors 25 and 26 and two total reflection mirrors 27 and 28. The color synthesizing means 30 includes two transparent blocks 32 and 33 and another transparent block 35. In FIGS. 8A and 8B, the color synthesizing means 30 includes two dichroic mirrors 32M and 33M and one total reflection mirror 35M.

The mirror support unit according to this embodiment is intended to support a mirror such as the dichroic mirrors 25 and 26, the total reflection mirrors 27 and 28, the dichroic mirrors 32M and 33M and the total reflection mirror 35M included in the color separation means 24 and the color synthesizing means 30. For simplification, one of the dichroic mirrors and the total reflection mirrors is represented by the mirror 66.

In FIG. 35, the mirror 66 is held to a fixed structure 70 by three holding members 68. In this case, the fixed structure 70 is a pair of support plates arranged on the two sides of the mirror 66, and is appropriately fixed to the housing 12 (FIG. 1)

Figure 36B:
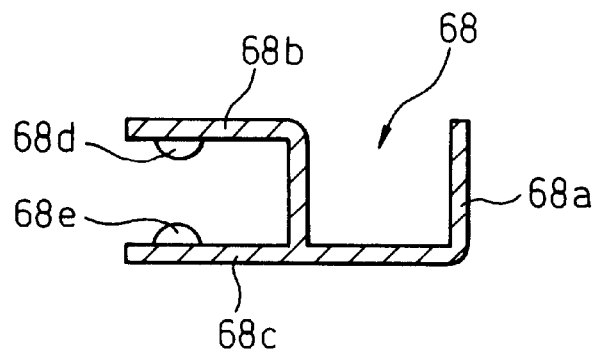
FIG. 36B is a cross-sectional view of the holding member.
Figure 36C:
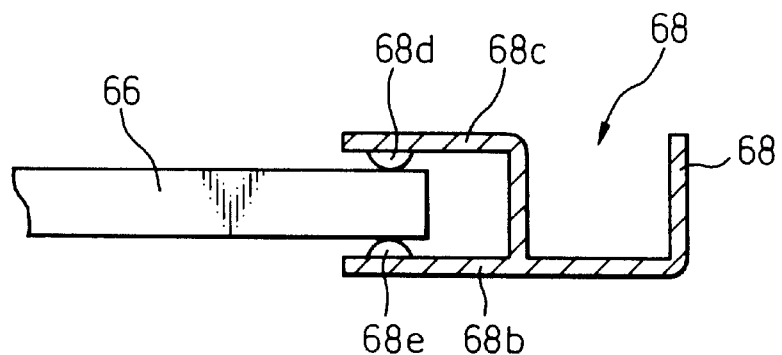
FIG. 36C is a cross-sectional view showing an example of holding the mirror with the holding member.

FIG. 36A is a perspective view of the holding member 68, FIG. 36B is a cross-sectional view of the holding member 68, and FIG. 36C a diagram showing the case in which the mirror 66 is held by the holding member 68.

In FIGS. 35 to 36C, each holding member 68 is of clip type and holds the mirror 66 by sandwiching it by point contact between one point on one side and the other corresponding point on the other side of the mirror 66. Specifically, the holding member 68 includes a base portion 68a mounted to the fixed structure 70 and a pair of forked planar arm portions 68b and 68c in the opposed relationship. The arm portions 68b and 68c include protrusions 68d and 68e, respectively. The protrusions 68d and 68e of the arm portions 68b and 68c are in the opposed relationship to each other, and adapted to hold the mirror 66 between them.

The holding member 68 is made of a material having a spring characteristic like stainless steel, and the initial dimension between the protrusions 68d and 68e is set to a value smaller than the thickness of the mirror 66. As a result, the protrusions 68d and 68e are adapted substantially to come into point contact with the mirror 66, and the arm portions 68b and 68c have a sufficient transverse length to provide the spring characteristic. The transverse length of the arm portions 68b and 68c is 10 mm, for example, and the length of the arm portions 68b and 68c from the branch point to the forward end thereof is 5.0 mm and the thickness 0.5 mm.

The base portion 68a has holes 68f, so that the base portion 68a is fixed to the fixed structure 70 by screws (not shown) inserted in the holes 68f. The base portion 68a may alternatively be built-in to the fixed structure 70.

In this configuration, the mirror 68 is held at three spatial positions which may be included in a single plane. The mirror 66, therefore, is not distorted to a shape including a concave or a convex surface. Also, at each position, the mirror 66 is fixedly sandwiched substantially by point contact between the opposed protrusions 68d and 68e, and therefore, is not distorted into a shape including a convex or concave surface. In the case where the holding member 68 holds the mirror 66 by comparatively long support surfaces, instead of by the protrusions 68d, 68e, for example, the mirror 66 would be distorted into a shape including a convex or concave surface unless the support surface is parallel to the plane including the three positions. According to this embodiment, the mirror 66 is not distorted into a shape including a convex or concave surface, so that the increased aberration of the projection lens or the increased distortion (TV distortion) of the projection image, the reduced resolution are avoided, thereby preventing the deterioration of the display quality of the projection type display apparatus.

Figure 37:
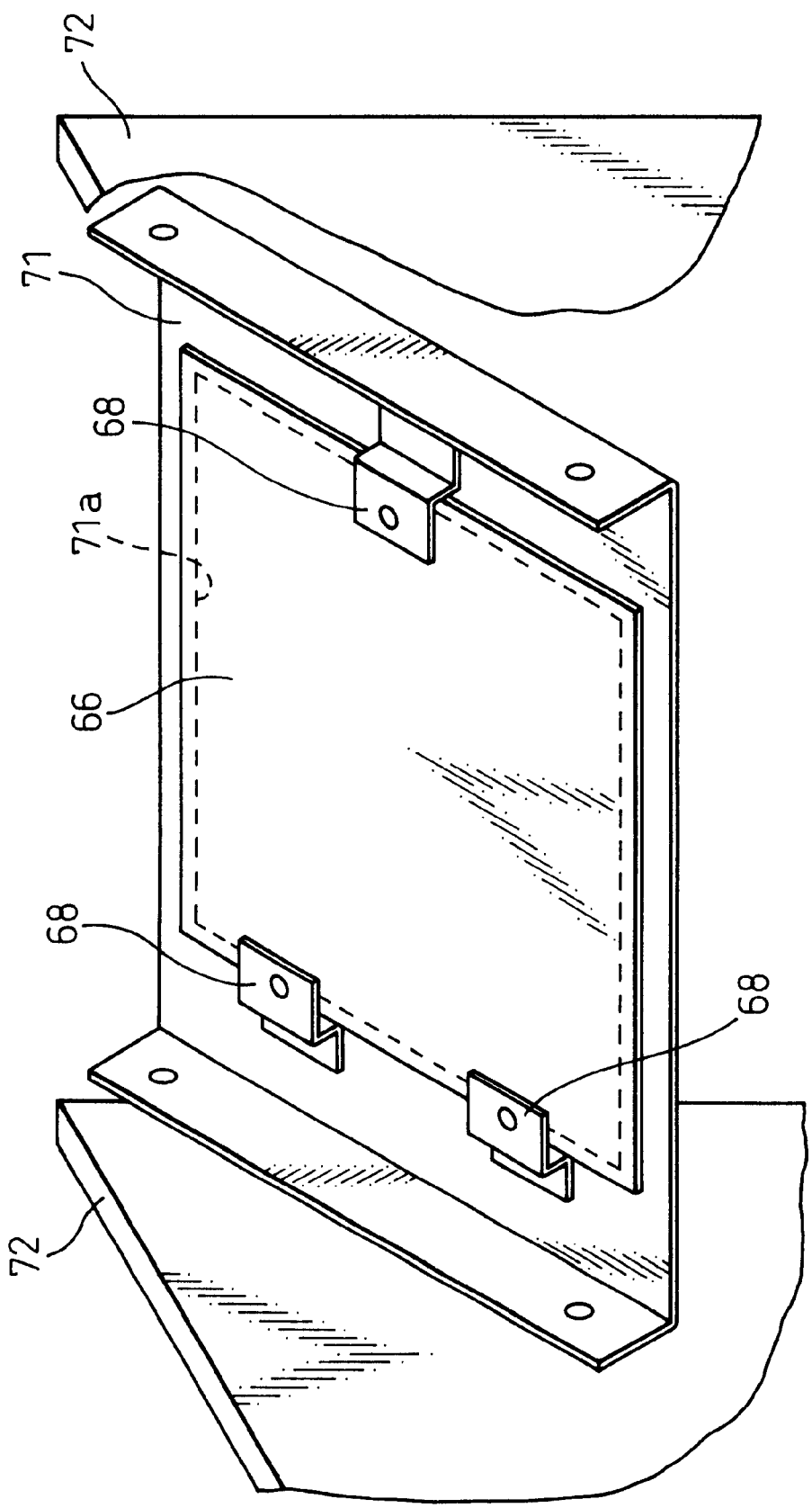
FIG. 37 is a perspective view showing another example of the mirror support unit.

FIG. 37 shows another example of the mirror support unit. In this example, the mirror 66 is held to a fixed structure 71 by three holding members. In this case, the fixed structure 71 is a member in the shape of a support plate having an opening 71a. This fixed structure 71 is further supported by a pair of support plates 72, which in turn are appropriately fixed to the housing 12 (FIG. 1). Each holding member 68 is similar to the holding member 68 of FIGS. 35 to 36C, and adapted to hold the mirror 66 on the front and rear sides thereof. Thus, also in this case, the mirror 66 can be held without distortion by the three holding members 68. The opening 71a of the fixed structure 71 is for preventing the shielding of the light path in the case where the mirror 66 is used as the dichroic mirror of FIG. 1, for example.

By employing this configuration, not only the mirror is prevented from being distorted but also a defect is prevented at the same time which may occur when a corner of the mirror 66 is broken by contact with an object. Also, since the mirror is not distorted by the holding members 68, the fixing structure can be reduced in both thickness and cost at the same time.

Figure 38A:
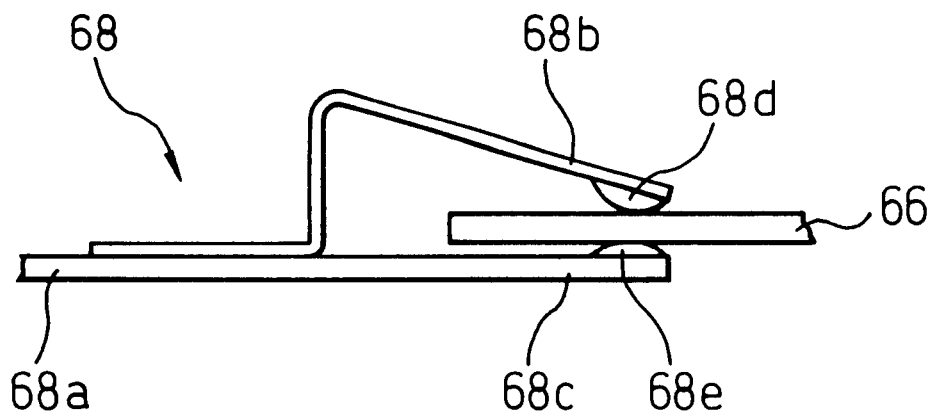
FIG. 38A is a side view of another example of the holding member.
Figure 38B:
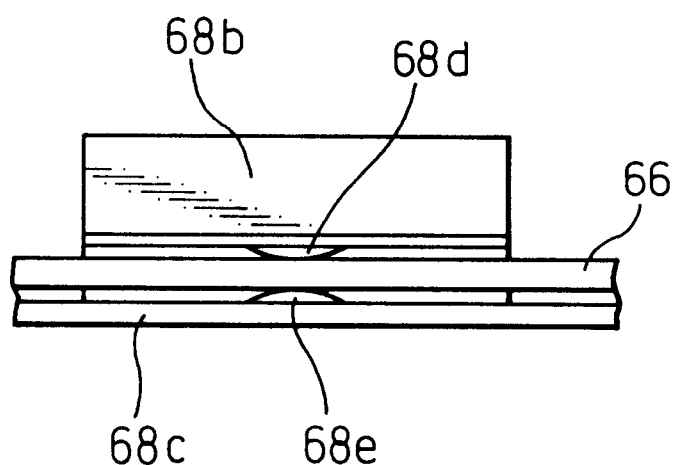
FIG. 38B is a front view of the holding member.

FIGS. 38A and 38B show another example of the holding member 68. FIG. 38A is a side view of the holding member 68, and FIG. 38B is a front view of the holding member 68. The holding member 68 is of clip type and holds the mirror 66 by sandwiching it substantially by point contact between a point on one surface and a corresponding point on the other surface of the mirror 66. Specifically, the holding member 68 includes a base portion 68a mounted to the fixed structure 70 and a forked pair of planar arm portions 68b and 68c. The arm portions 68b and 68c have protrusions 68d and 68e, respectively. The protrusions 68d and 68e of the arm portions 68b and 68c are in the opposed relationship to each other, and adapted to hold the mirror 66 therebetween. In the case of FIG. 36A, a pair of the arm portions 68b and 68c are substantially parallel to each other, while in this embodiment, one arm portion 68b is arranged at an angle to the other arm portion 68c. As a result, the spring force for holding the mirror 66 by the pair of the arms 68b and 68c can be adjusted. Thus, the distortion of the mirror 66 is prevented and in addition the holding power can be increased to eliminate the mirror displacement effectively.

Figure 39A:
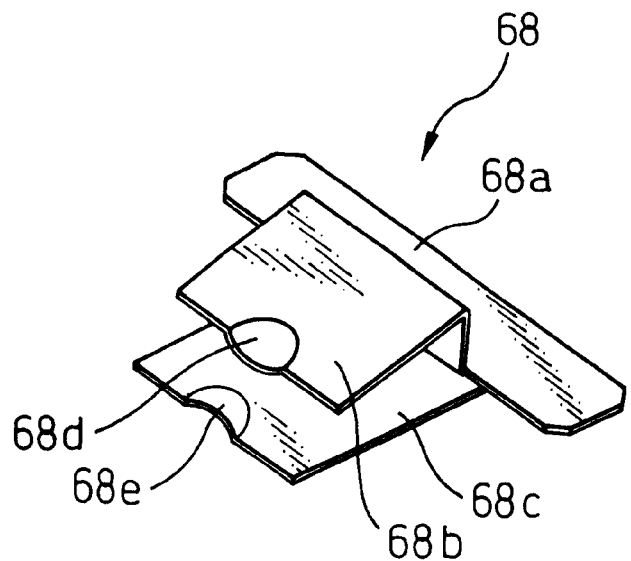
FIG. 39A is a perspective view of another example of the holding member.
Figure 39B:
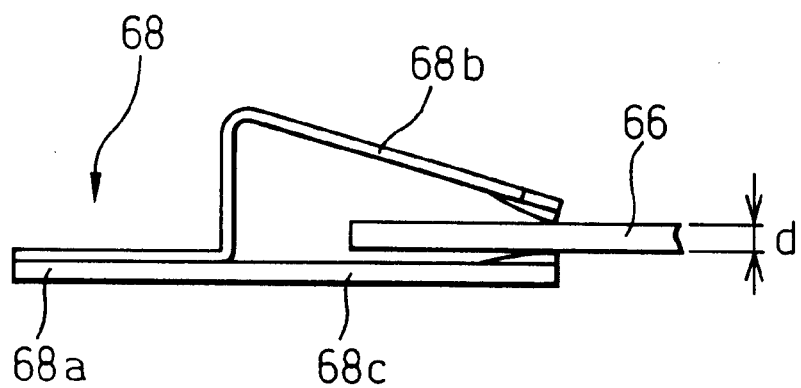
FIG. 39B is a side view of the holding member.

FIGS. 39A and 39B show another example of the holding member 68. FIG. 39A is a perspective view showing the holding member 68, and FIG. 39B a side view showing the holding member 68. The holding member 68 is of clip type and holds the mirror 66 by sandwiching it substantially by point contact between one point on one surface and a corresponding point on the other surface of the mirror 66. The holding member 68 includes a base portion 68a and a pair of opposed arm portions 68b and 68c. The arm portions 68b and 68c have protrusions 68d and 68e, respectively. In the holding member 68 shown in FIGS. 38A to 39B, the arm portions 68b and 68c and the part of the base portion 68a extending from the arm portions 68b and 68c are formed as two different members and subsequently integrated with each other.

Further, the protrusions 68d and 68e are formed in a curved shape, and preferably formed as a part of a sphere. In FIGS. 36A to 38B, the protrusions 68d and 68e are formed substantially hemispherically, while in FIGS. 39A and 39B, the protrusions 68d and 68e are formed substantially in a quadrant sphere.

Figure 40A:
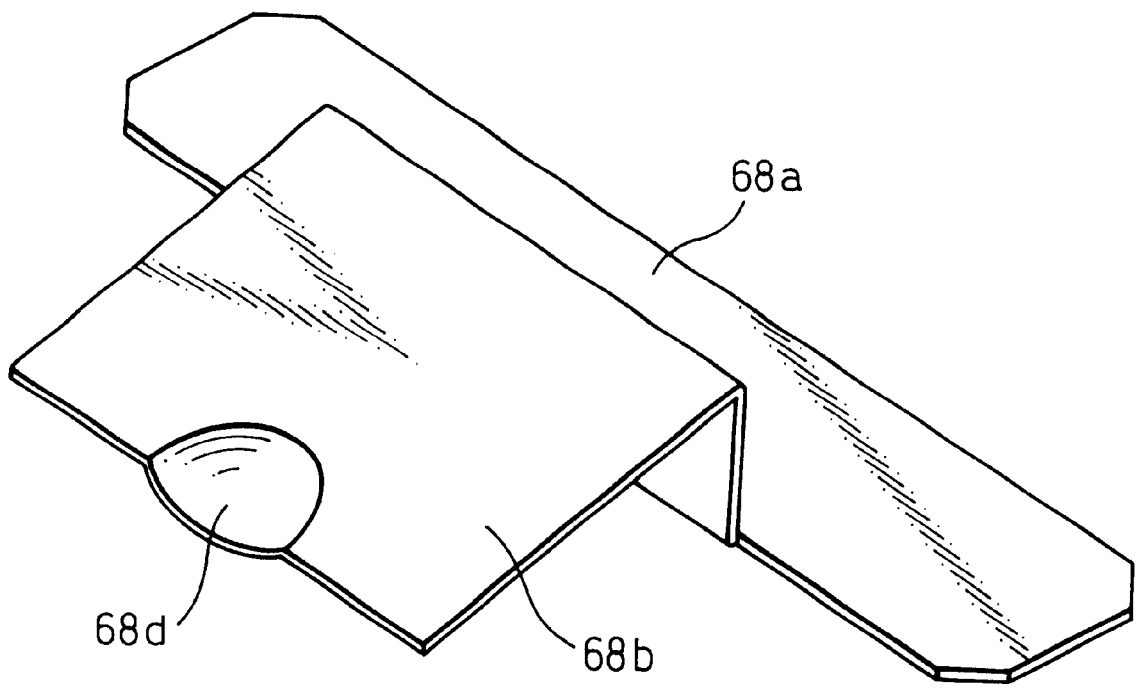
FIG. 40A is a perspective view of, in enlarged form, one of the arm portions of FIGS. 39A and 39B, for explaining the shape of the protrusions of the arm portions of the holding member.
Figure 40B:
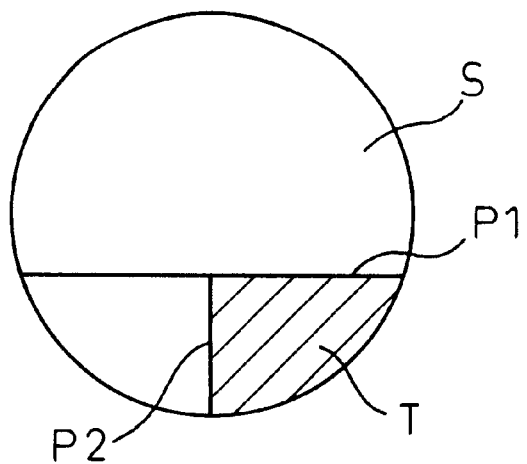
FIG. 40B is a view for explaining the shape of the protrusion of the arm portion of FIG. 40A.

FIG. 40A is a perspective view showing one arm portion 68b of FIGS. 39A and 39B in enlarged form. FIG. 40B is a diagram explaining the shape of the protrusion 68d of the arm portion 68b shown in FIGS. 39A to 40A. In FIG. 40B, a sphere S is cut along a plane P1, and a portion of the sphere S on one side of the plane P1 is further cut by a plane P2 perpendicular to plane P1. The resulting generally quadrant portion T constitutes each of the protrusions 68d and 68e.

The plane P1 is displaced from the diameter of the sphere S and therefore the spherical portion T is a quadrant not exactly but substantially. The protrusions 68d and 68e of this shape can hold the mirror 66 substantially by point contact, and are suitable for production with molding by single-action pressing in a die described with reference to FIGS. 41A and 41B.

The protrusions 68d and 68e of the holding member 68 are substantially in the shape of quadrant. As a result, the radius of the protrusions 68d and 68e embossed in a die can be reduced, thereby improving the accuracy of the position for contact with the mirror 66. In the case where the protrusions 68d and 68e of the holding member 68 are hemispherical, on the other hand, the upper parts of the protrusions 68d and 68e are liable to crack in the process of reducing the radius.

Figure 41A:
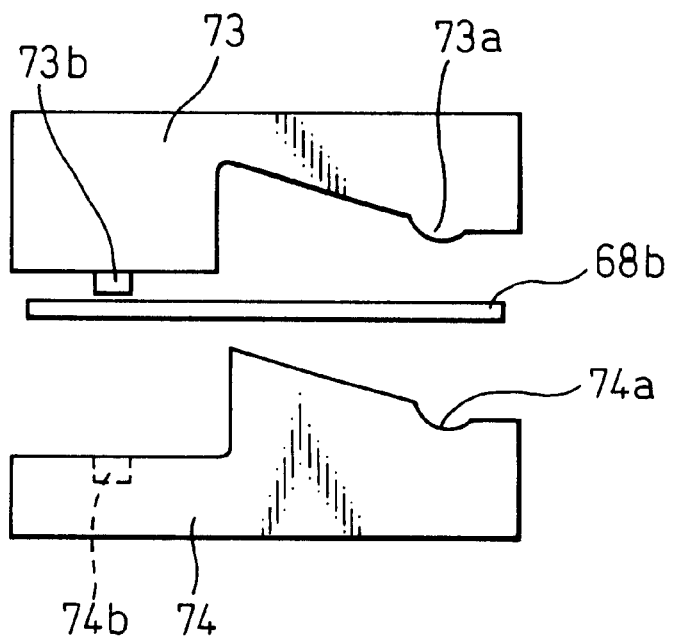
FIG. 41A is a view showing the process for molding one of the arm portions, for explaining the fabrication process of the arm portions of FIGS. 39A to 40B.
Figure 41B:
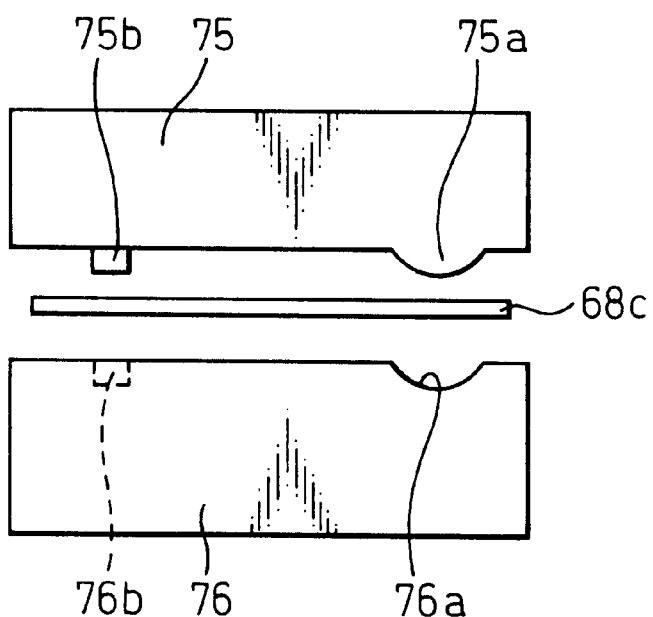
FIG. 41B is a view showing the process of molding the other arm portion.

FIGS. 41A and 41B explain the process of pressing the arm portions separately fabricated as shown in FIGS. 39A to 40A. FIG. 41A shows the step of molding one arm portion corresponding to the arm portion 68b and the part of the base portion 68a extending from the arm portion 68b, and FIG. 41B shows the step of pressing the other arm portion corresponding to the arm portion 68c and the part of the base portion 68a extending from the arm portion 68c.

The die shown in FIG. 41A includes an upper die 73 and a lower die 74. The upper die 73 has a protrusion 73a corresponding to the shape of the protrusion 68d to be formed, and the lower die 74 has a recessed portion 74a corresponding to the shape of the protrusion 68d to be formed and having a shape complementary with the protrusion 73a. A metal plate 68B is arranged between the upper die 73 and the lower die 74, between which a pressure is imparted. Thus, one arm portion corresponding to the arm portion 68b and the part of the base portion 68a extending from the arm portion 68b is formed by single-action pressing in the die. By the way, the upper die 73 has a positioning pin 73b, and the lower die 73 has a recessed portion 74b for receiving the positioning pin 73b. A corresponding positioning hole is thus formed in one molded arm portion.

The die shown in FIG. 41B include an upper die 75 and a lower die 76. The upper die 75 has a protrusion 7a corresponding to the shape of the protrusion 68e to be formed, while the lower die 76 has a recessed portion 76a corresponding to the shape of the protrusion 68e to be formed and having a shape complementary with the protrusion 75b. The metal plate 68C is arranged between the upper die 75 and the lower die 76, and pressure is imparted between the upper die 75 and the lower die 76. In this way, the other arm portion corresponding to the arm portion 68c and the portion of the base portion 68a extending from the arm portion 68c are formed by single-action pressing in the die. By the way, the upper die 75 includes a positioning pin 75b, and the lower die 76 has a recessed portion 76b for receiving the positioning pin 75b, thereby forming a positioning hole in the other arm portion molded. The positioning holes of the one arm portion and the other arm portion thus formed are set in registry with each other and integrated thereby to form the holding member 68. By the way, in the case where the one arm portion and the other arm portion are integrated by screws, the upper dies 73 and 75 and the lower die 76 have a protrusion and a recess for forming a hole through which to pass the screw.

The holding member 68 is normally fabricated by the casting process in which a material is poured into a mold having a cavity corresponding to the holding member 68. According to this embodiment, however, the holding member 68 can be produced by single-action pressing in a die for a reduced cost. In similar fashion, the holding member 68 can also be pressed with resin.

By fixing the two arm portions making up the holding member 68 to the fixed structures 70 or 71 by screws, the positions of the upper and lower portions of the holding member 68 are determined uniformly, thereby making it possible to reduce the variations in the position of the upper and lower protrusions, i.e. to prevent the distortion of the mirror due to the displacement. Also, by fabricating the holding member 68 using a stainless steel plate or a copper plate or a spring material of high polymer resin, while reducing the interval d between the upper and lower protrusions below the thickness of the mirror, an always constant pressure can be imparted to the mirror 66 through the protrusions of the holding member 68, thereby making it possible to prevent the horizontal displacement of the mirror 66.

Figure 42A:
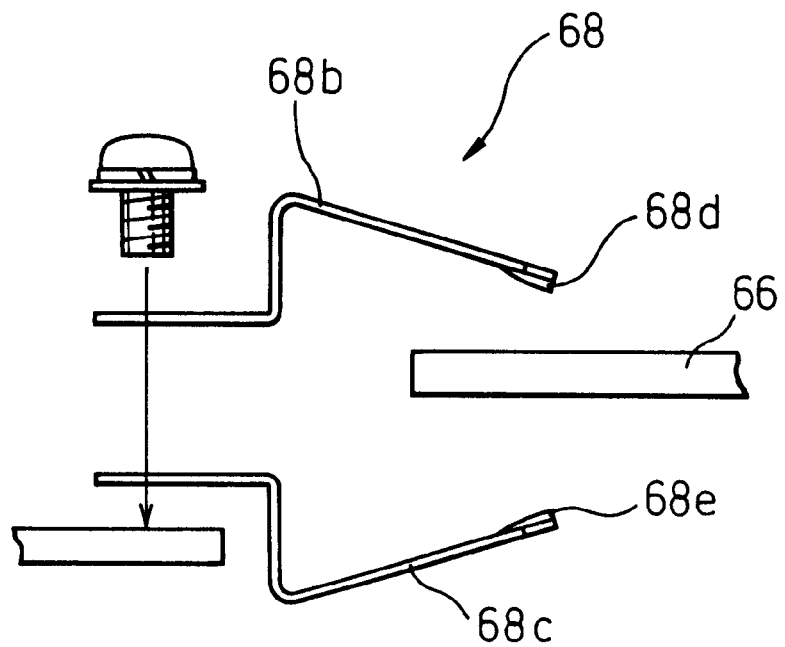
FIG. 42A is a view showing another example of the holding member, under the state before two arm portions are integrated.
Figure 42B:
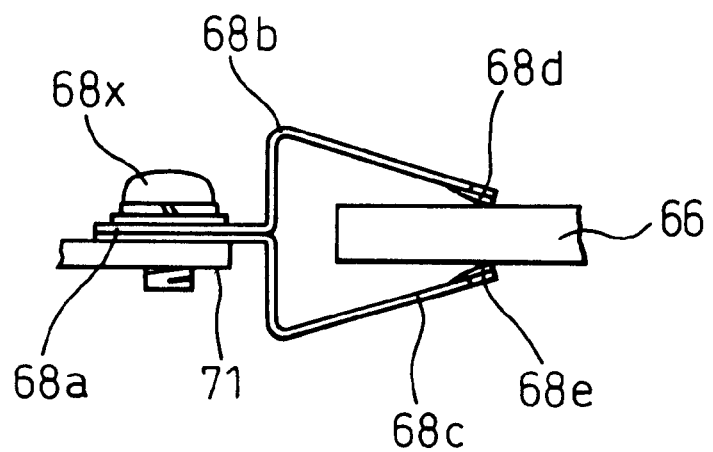
FIG. 42B is a view of the holding member under the state after the two arm portions are integrated.

FIGS. 42A and 42B show another example of the holding member 68. FIG. 42A shows the state before the two arm portions are integrated, and FIG. 42B shows the state after the two arm portions are integrated. In this example, the two arm portions 68b and 68c of the holding member 68 are assumed to have the same shape and combined together with one of them inverted relative to the other while the mirror 66 is held between the two combined arm portions. The two arm portions are fixed to the fixed structure 71 with screws 68x.

With this configuration, the two arm portions of the holding member 68 can be fabricated with the same die, and any displacement of the protrusions 68d and 68e can be prevented. Also, the provision of only a single die reduces the cost.

Figure 43A:
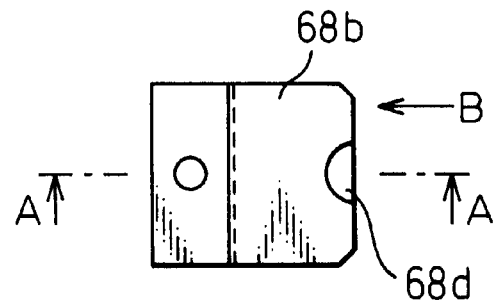
Figure 43B:
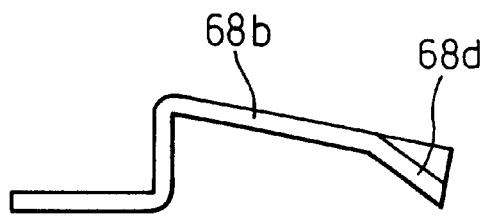
Figure 43C:
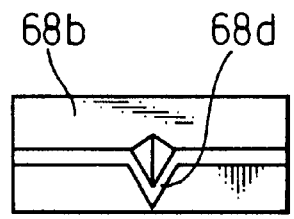
Figure 43D:
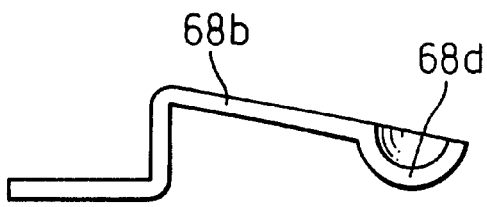
Figure 43E:
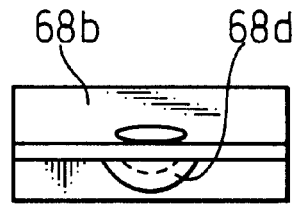
Figure 43F:
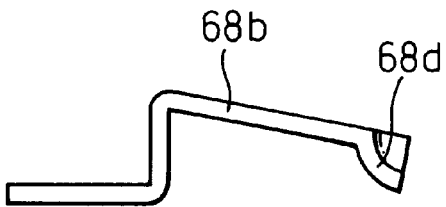
Figure 43G:
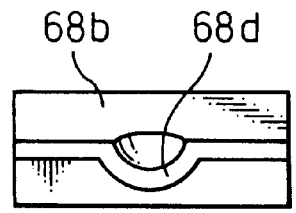

FIGS. 43A to 43 G show various examples in which the protrusion 68d ( 68e) of the holding member 68 is formed in a curved shape. FIG. 43A is a plan view of the arm portion 68b having the protrusion 68d, and FIGS. 43B to 43G are cross-sectional views taken in line A—A in FIG. 43A, and front views taken along arrow B in FIG. 43A. FIG. 43B is a cross-sectional view of the arm portion 68b having the protrusion 68d in the shape of a V-grooved stop. FIG. 43C is a front view of the arm portion 68b in FIG. 43B. FIG. 43D is a cross-sectional view of the arm portion 68b having the protrusion 68d in the shape of hemispherically drawn shape. FIG. 43E is a front view of the arm portion 68b of FIG. 43D. FIG. 43F is a cross-sectional view of the arm portion 68b having the protrusion 68d in the shape of quadrantly drawn shape. FIG. 43G is a front view of the arm portion 68b of FIG. 43F.

FIG. 44 shows another example of the mirror support unit. Two holding members 68 of the three holding members for holding the mirror 66 are fixed to the fixed structure 70 located below, and the remaining one holding member 68 is fixed to the fixed structure 70 located above. As a result, the weight of the mirror 66 can be supported by two holding members 68 fixed to the lower fixed structure 70, and therefore the variations in position due to the weight can be suppressed, while at the same time, preventing the reduction in the display quality of the apparatus due to the displacement of the mirror 66.

FIG. 45 shows another example of the mirror support unit. In this embodiment, the holding members 68 are arranged on two opposed sides of the fixed structure 71 having the opening 71a, and pins 77 are arranged on the sides of the fixed structure 71 having no holding member 68, whereby the mirror 66 is prevented from being displaced toward the direction having no holding members 68 when a shock is applied to the projection type display apparatus, thereby preventing the reduction in the display quality of the apparatus due to the displacement of the mirror 66.

Figure 46:
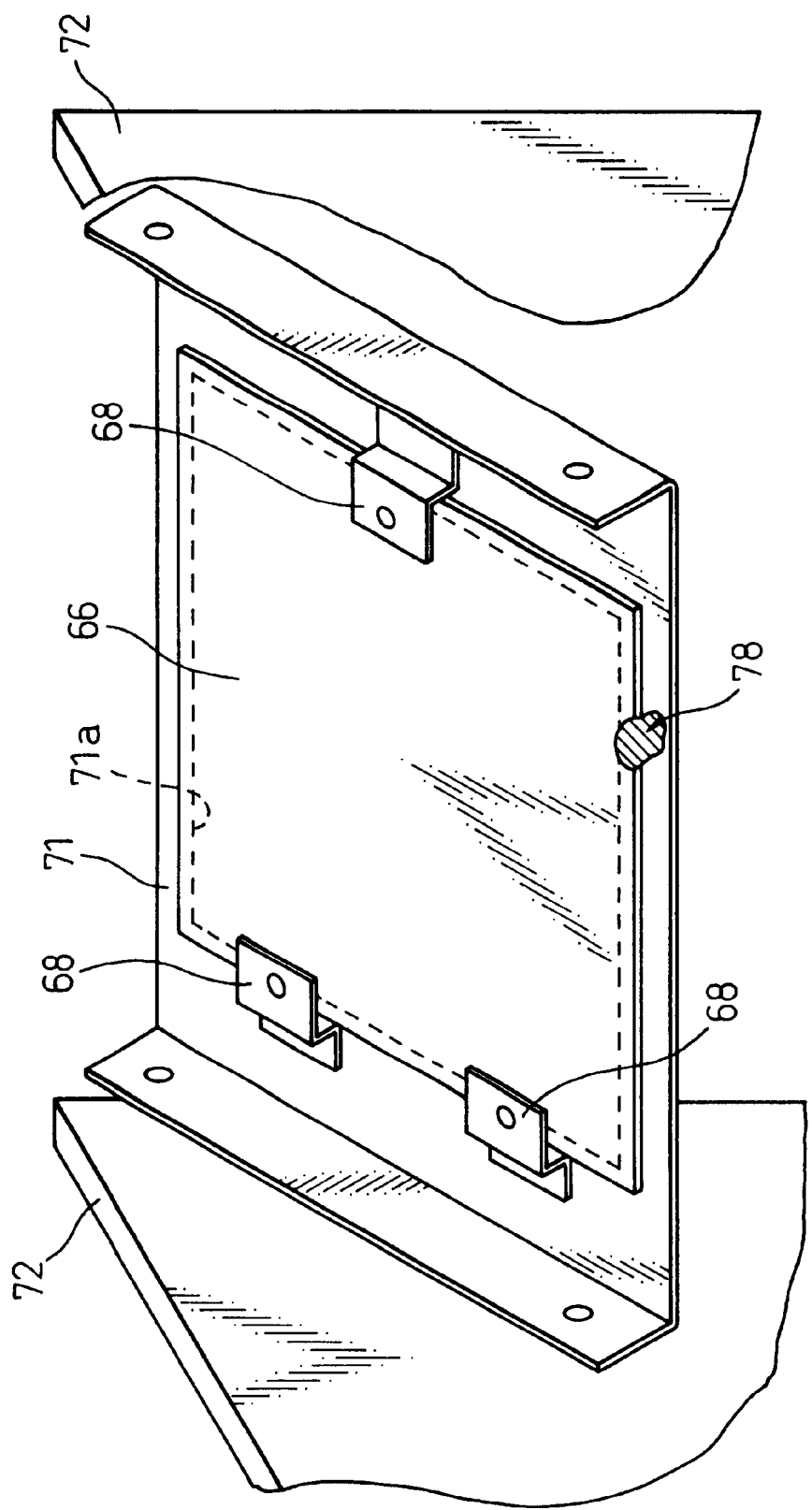
FIG. 46 is a perspective view showing another example of the mirror support unit.

FIG. 46 shows another example of the mirror support unit. In this embodiment, the holding members 68 are provided on the opposed two sides of the fixed structure 71 having the opening 71a, and an flexible adhesive 78 is applied to the side having no holding members 68, the modulus of elasticity after setting the adhesive 78 being smaller than the modulus of elasticity of the mirror 66, the adhesive 78 after setting having flexibility. With this configuration, the adhesive 78 can be applied after fixing the mirror 66. Also, the fabrication process is simplified in view of the fact that the effect of preventing the displacement of the mirror 66 can be produced at one point, thereby reducing the cost of the fixed structure 71 of the mirror 66. Also, since the adhesive 78 has flexibility, a shock, even when applied to the projection type display apparatus after being built in, can be absorbed, with the result that the mirror 66 is prevented from being displaced or distorted due to the difference in the thermal coefficient of expansion between the mirror 66, the holding members 68 and the adhesive 78 as well as from the displacement or distortion of the mirror 66 itself.

Figure 47:
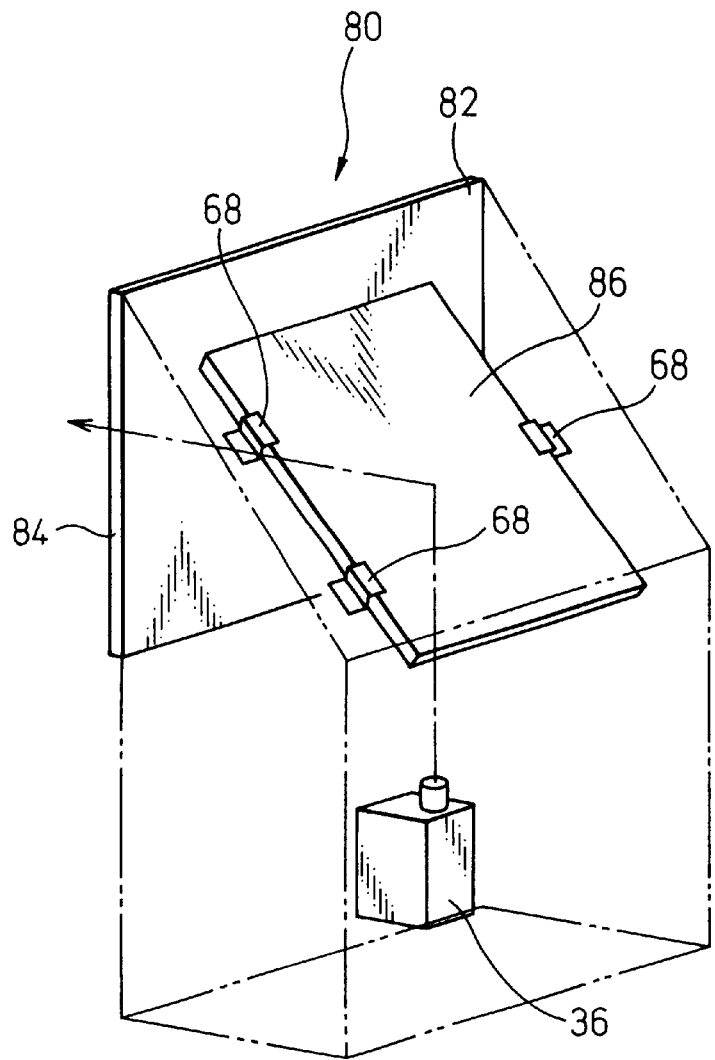
FIG. 47 is a perspective view showing still another embodiment of the invention.

FIG. 47 shows still another embodiment of the invention. In this embodiment, the projection type display apparatus 80 comprises a housing 82 in which a plurality of optical members are arranged. According to the embodiment shown in FIG. 1, these optical members include the light source 14, the light valves 20R, 20G and 20B, the color separation means 24, the color synthesizing means 30 and the projection lens 36. FIG. 47 shows the projection lens 36 among these optical members. This projection type display apparatus 80 is of rear projection type and includes a screen 84. Further, a mirror 86 is arranged between the projection lens 36 and the screen 84. The image light projected from the projection lens 36 is projected onto the screen 84 with the light path thereof being bent by the mirror 86.

This mirror 86 poses the same problem as the mirror 66 in the preceding embodiment. Thus, this mirror 86 is also supported by a support unit similar to the one described above. Specifically, the mirror 86 is held to a fixed structure (a housing 82 or a member fixed to the housing 82) substantially by point contact with three holding members 68. The holding members 68 can have the same structure as those explained with reference to FIGS. 35 to 46. Therefore, the mirror 86 can be supported without causing any distortion and therefore the distortion of the image can be prevented, in a manner similar to the embodiment with respect to the mirror 66.

Figure 48:
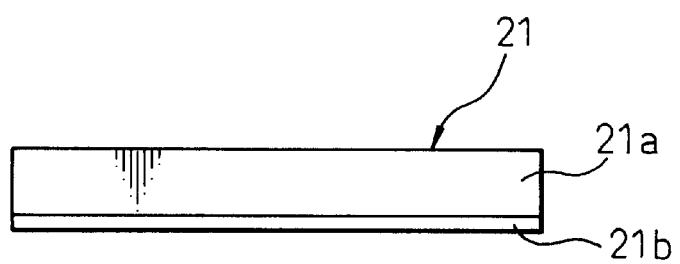
FIG. 48 is a view showing a further embodiment of the invention.

FIG. 48 shows still another embodiment of the invention. As shown in FIG. 1, polarizers 21 and 22 are arranged before and after each light valve 20R, 20G and 20B. FIG. 48 shows the polarizer 21 including a transparent substrate 21a and a film-like polarized light generating member 21b bonded to the substrate 21a. The polarized light generating member 21b comprises a plurality of dielectric multilayered film, for example.

In the case where a large amount of light is irradiated onto the polarizer 21 like the projection type display apparatus, the polarizer 21 may be deteriorated by heat due to light absorption in the polarized light generating process (the process allowing the required polarized light to pass through and the other polarized light to be absorbed by the film-like polarized light generating member 21b). In order to prevent the deterioration of the polarizer 21, a large cooling capacity is required. In this embodiment, the transparent substrate 21a is composed of a transparent crystalline substrate, and the film-like polarized light generating member 21b is bonded to the transparent crystalline substrate 21a, thereby facilitating the cooling of the polarizer 21 which is otherwise easily deteriorated by heat. In the prior art, the substrate 21a is composed of a transparent glass plate.

The crystalline substrate 21a, which is composed of sapphire or diamond has a thermal conductivity several tens of times higher than the conventional glass, and therefore has a high efficiency of radiation of the heat generated by the light absorption in the polarized light generating member 21b, thereby simplifying the cooling structure. The polarized light may be disturbed by the ellipsoid of index of refraction in the crystalline substrate 21a and the display quality is deteriorated. By arranging the directions of the long axis and the short axis of the ellipsoid of index of refraction in the transparent crystal substrate coincide with the polarization axis of the film-like polarized light generating member, disturbance of the polarized light and deterioration of the display quality of the display apparatus can be prevented.

As a result, the transparent crystalline substrate 21 is preferably composed of one of sapphire and diamond. Also, the directions of the long axis and the short axis of the ellipsoid of index of refraction in the transparent crystal substrate 21a is preferably coincident with the polarization axis of the film-like polarized light generating member.

As described above, according to the present invention, there is provided a projection type display apparatus comprising optical members and electrical members arranged with high density, wherein the fresh air is introduced from the bottom of the apparatus by an intake fan, the light valves and the polarizers often generating heat due to light absorption are cooled by the cooling air introduced from outside, the cooling air is circulated through the various internal parts of the apparatus, and the cooling air is introduced to the heat generating member requiring an enhanced cooling by a dedicated fan. In this way, the flow of the cooling air is generated forcibly in the apparatus, whereby the cooling air flows smoothly from the intake port to the exhaust port along a predetermined route without convection in the apparatus. Thus, the heat generated in the apparatus is efficiently exhausted out of the apparatus, and therefore the various parts can be efficiently cooled for an improved apparatus reliability. Further, the fan is rotated only as required, so that the operating load of each fan is minimized and so is the fan noises, thereby realizing a high-density, compact and reliable apparatus with small noises.

Also, since the mirrors in the projection type display apparatus can be fixed without distortion in a simple structure, the deterioration of display quality of the projected image is prevented, thereby realizing a high-performance projection type display apparatus.

Further, the mirrors and the polarizer can be efficiently cooled.

Figure 49:
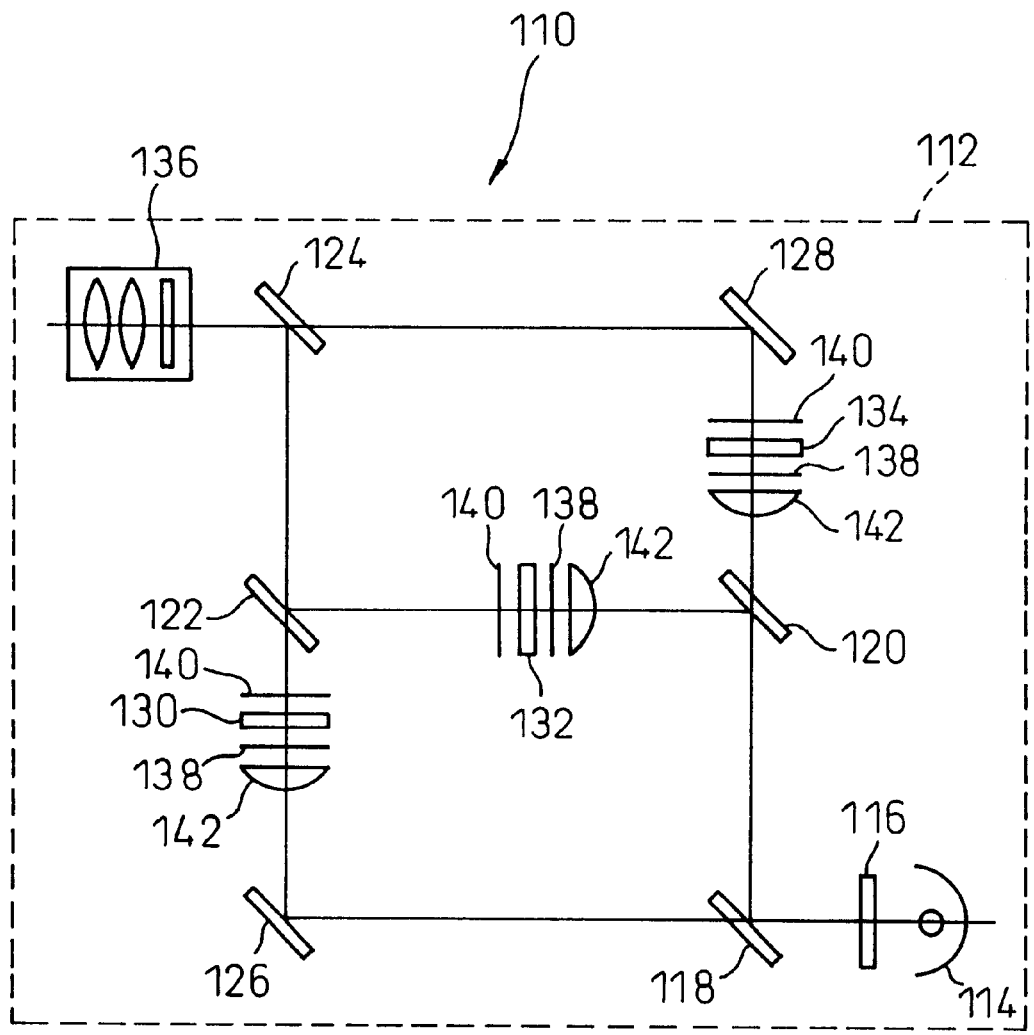
FIG. 49 is a view showing a projection type liquid crystal display apparatus according to a further embodiment of the present invention.

FIG. 49 shows a projection type liquid crystal display apparatus according to the still another embodiment of the present invention. The projection type liquid crystal display apparatus 110 comprises a housing 112, in which the following optical elements are arranged. The projection type liquid crystal display apparatus 110 comprises a light source 114 comprising a metal halide lamp and a reflector, a UV/IR cut filter 116, color separating dichroic mirrors 118 and 120, color synthesizing dichroic mirrors 122 and 124, total reflection mirrors 126 and 128, first to third liquid crystal panels 130, 132 and 134, and a projection lens 136.

A pair of polarizers 138 and 140 are arranged on opposite sides of each of the first to third liquid crystal panels 130, 132 and 134, and a condenser lens 142 is arranged before the polarizer 138 on the incidence side. The projection lens 136 is arranged at the focal point of each condenser lens 142. In this projection type liquid crystal display apparatus, the parallel light rays emitted from the non-polarized light source 114 become visible light rays at the UV/IR cut filter 116, and after being transmitted through or reflected by the color separating dichroic mirrors 120 and 122, separated into the light of the wavelength bands of the three primary colors RGB. The light of each wavelength band thus separated in color is linearly polarized by the polarizers 138 on the incidence side of each of the liquid crystal panels 130, 132 and 134 and enter the liquid crystal panels 130, 132 and 134, respectively.

In each liquid crystal panel 130, 132 or 134, an image is formed based on a control signal, and the image light passing through the liquid crystal panels 130, 132 or 134 is spatially modulated based on the image through the polarizer 140 on the emission side. The polarizers 138 and 140 are composed of a polarization film attached to a glass substrate. Respective images of RGB are synthesized by the color synthesizing dichroic mirrors 122 and 124, and then projected in an enlarged form by the projection lens 136.

For improving brightness in the projection type liquid crystal display apparatus, the amount of light entering the liquid crystal panels 130, 132 and 134 (and the polarizers arranged before and after them) is required to be increased. However, this leads to the problem of the heat generated by the liquid crystal panels 130, 132 and 134 and the polarizers 138 on the incidence side. In view of this, cooling means are provided for the liquid crystal panels 130, 132 and 134 and the polarizers 138 on the incidence side.

Figure 50:
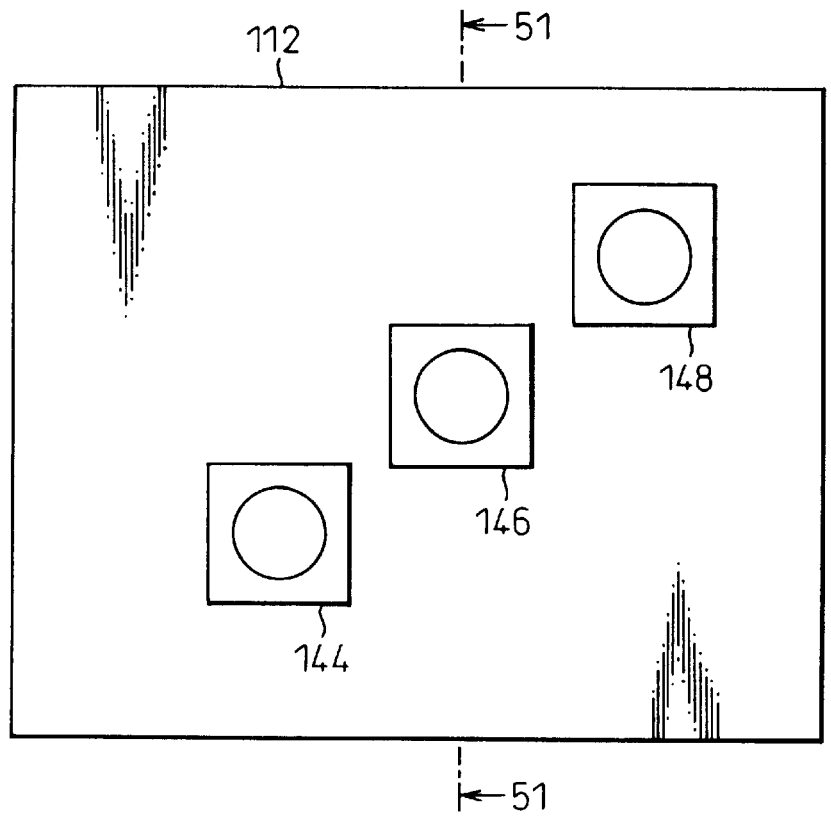
FIG. 50 is a side view showing the casing of the projection type liquid crystal display apparatus of FIG. 50.
Figure 51:
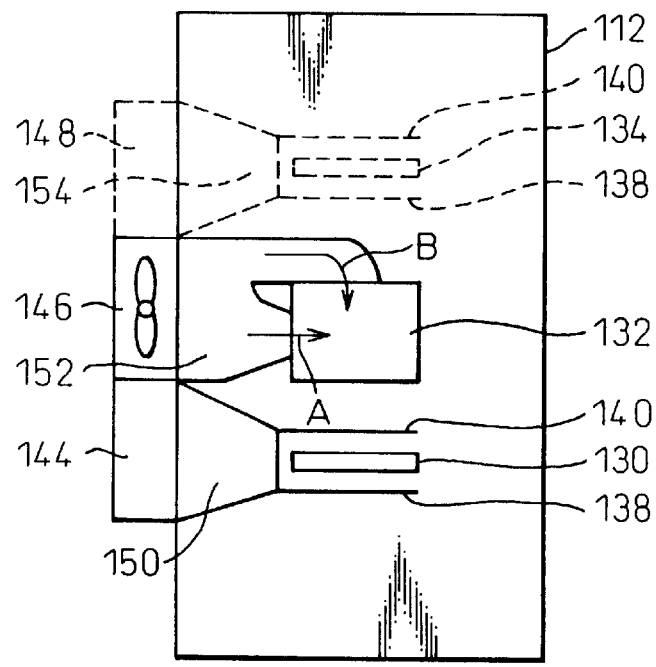
FIG. 51 is a cross-sectional view showing the casing of FIG. 50 taken in line 51—51 in FIG. 50.

FIGS. 50 to 53 show the cooling means. FIG. 50 is a side view showing the casing 112 of the projection type liquid crystal display apparatus 110, and FIG. 51 is a cross-sectional view of the casing 112 of FIG. 2 taken in line 51—51 in FIG. 2. The cooling means includes fans 144, 146 and 148 arranged on the outer side of the casing 112. The fan 144 is arranged at a position corresponding to the first liquid crystal panel 130, the fan 146 is arranged at a position corresponding to the second liquid crystal panel 132, and the fan 148 is arranged at a position corresponding to the third liquid crystal panel 134.

Figure 52:
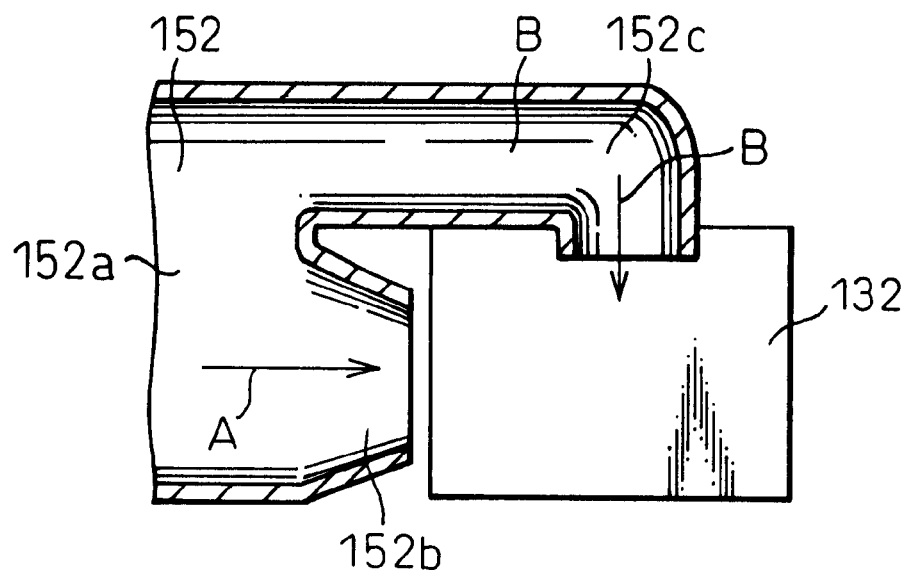
FIG. 52 is an enlarged cross-sectional view showing a part of the central air duct in FIG. 51.
Figure 53:
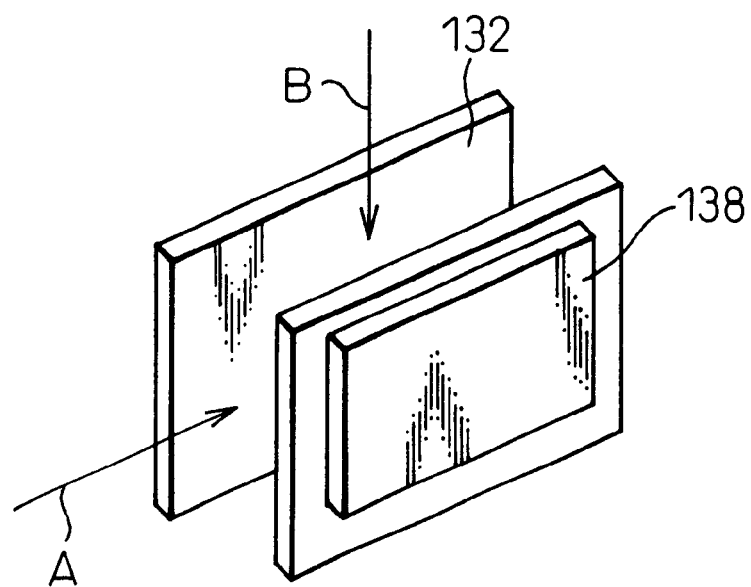
FIG. 53 is a perspective view showing the direction of air flow of the cooling means and the liquid crystal panel and the polarizer of FIGS. 50 to 52.

Air ducts 150, 152 and 154 are attached to the inner wall of the casing 112 and extend from the fans 144, 146 and 148 toward the liquid crystal panels 130, 132 and 134, respectively. FIG. 52 is an enlarged view showing a part of the air duct 152 in the center of FIGS. 49 and 50. FIG. 53 shows the direction of air flow of the air duct 152 and the liquid crystal panel 132 and the polarizer 138. In FIGS. 51 to 53, the air duct 152 includes a common duct portion 152a and branch duct portions 152b and 152c branching from the common duct portion 152a. The branch duct portion 152b is formed to blow the air from a first direction indicated by arrow A substantially parallel to the surface of the liquid crystal panel 132 and the surface of the polarizer 138. The cooling air blown from the branch duct portion 152b is blown through between the liquid crystal panel 132 and the polarizer 138 in the first direction indicated by arrow A.

The branch duct portion 152c is formed in such a manner as to blow the air from a second direction indicated by arrow B substantially parallel to the surface of the liquid crystal panel 132 and the surface of the polarizer 138. The cooling air blown from the branch duct portion 152c is blown through between the liquid crystal panel 132 and the polarizer 38 in the second direction indicated by arrow B.

The first direction indicated by the arrow A and the second direction indicated by arrow B are perpendicular to each other, and cross each other substantially at the center of the liquid crystal panel 132 and the polarizer 138. The branch duct portion 152b is arranged in such a manner as to cool the whole surface of the liquid crystal panel 132 and the whole surface of the polarizer 138, and the branch duct portion 152c is adapted to strategically cool the central portions of the surface of the liquid crystal panel 132 and the surface of the polarizer 138.

With this configuration, components of the cooling air are introduced substantially in parallel to the surface of the polarizer 138 and the liquid crystal panel 132 in the two crossing directions A and B, and impinge on each other at the central area of the polarizer 138 and the liquid crystal panel 132 thereby to cause a turbulent flow. The turbulent flow thus generated increases the amount of the cooling air which contacts the surface of the polarizer 138 and the liquid crystal panel 132. As a result, the cooling efficiency can be improved. At the same time, by setting the impinging position in the vicinity of the point of maximum temperature (central area of the polarizer and the liquid crystal panel), a uniform temperature distribution can be obtained for the polarizer 138 and the liquid crystal panel 132. Thus, the deterioration of the optical characteristics of the polarizer 138 and the liquid crystal panel 132 which might otherwise occur due to overheat can be prevented for an improved display quality. Especially, the air outlet of the branch duct portion 152c is narrowed like the nozzle so that the air from the upper direction is blown concentratedly onto the central portion of the liquid crystal panel. As a result, in spite of a small capacity, the cooling efficiency from the branch duct portion 152c is improved. The polarizer and the liquid crystal panel have their own maximum operating temperature for maintaining the service life and the optical characteristics thereof, and therefore, it is desirable to strategically and efficiently cool the central portion of the display unit.

With regard to the central air duct 152, the first direction indicated by arrow A is perpendicular to the page of FIG. 49, and the second direction indicated by arrow B is downward in parallel to the page of FIG. 49. with regard to the other air ducts 150 and 154, the first direction indicated by arrow A is perpendicular to the page of FIG. 1, and the second direction indicated by arrow B is leftward or rightward in parallel to the page of FIG. 49. Also, the polarizer and the liquid crystal panel have a horizontally elongated rectangular shape, and the first and second directions are perpendicular to the long and short sides, respectively, of the rectangle. In this case, the amount of the air blown in the direction perpendicular to the long side of the rectangle from the branch duct portion 152b is smaller than the amount of the air blown in the direction perpendicular to the short side of the rectangle from the branch duct portion 152b.

Figure 54:
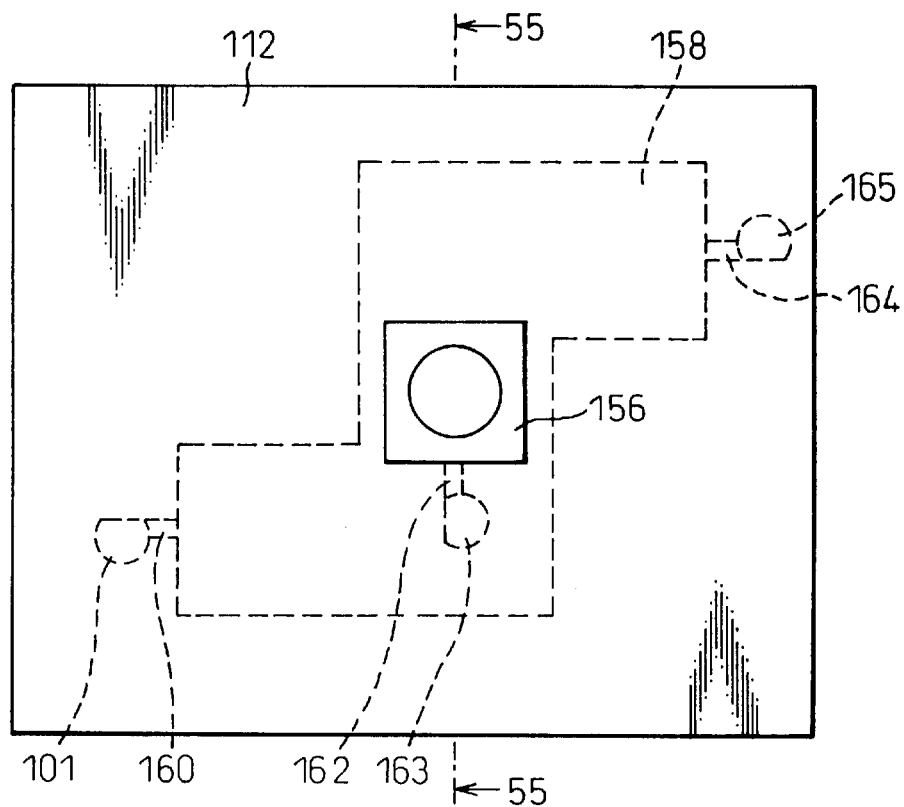
FIG. 54 is a side view showing a casing of the projection type liquid crystal display apparatus.
Figure 55:
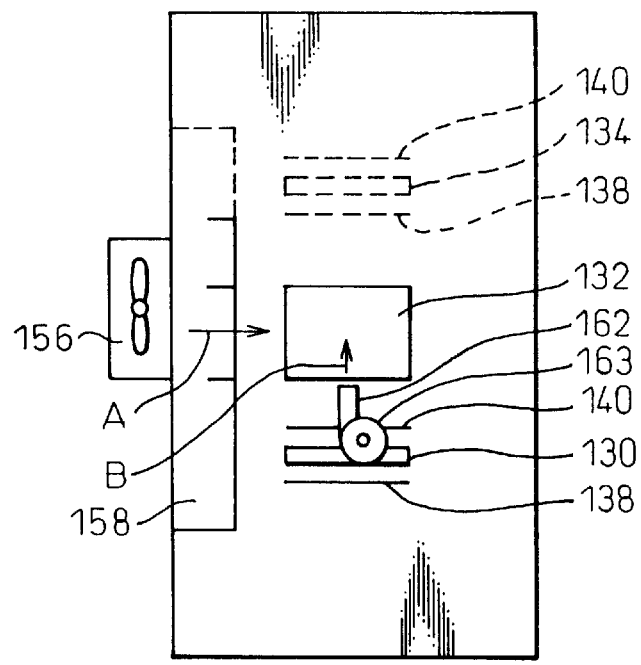
FIG. 55 is a cross-sectional view of the casing of FIG. 54 taken in line 55—55 in FIG. 54.
Figure 56:
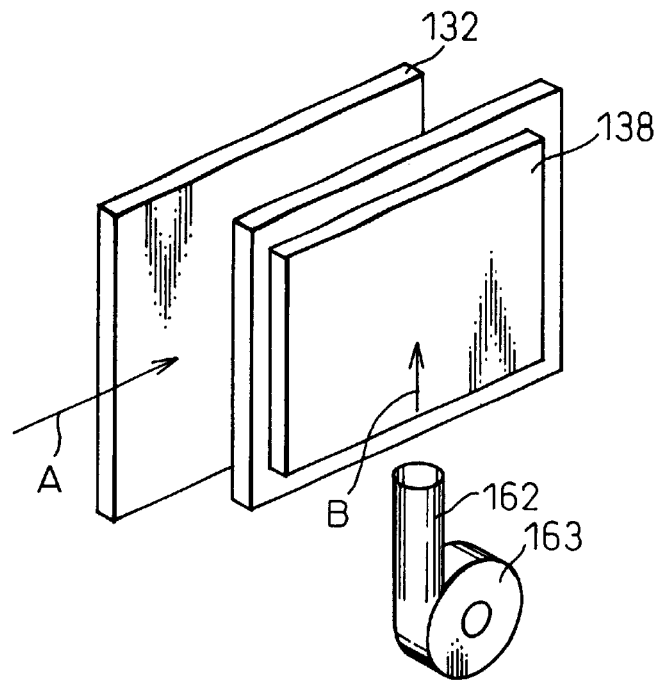
FIG. 56 is a view showing the direction of air flow of the cooling means and the liquid crystal panel and the polarizer of FIG. 55.

FIGS. 54 to 56 show another example of the cooling means. FIG. 54 is a side view showing a casing 112 of the projection type liquid crystal display apparatus 110, and FIG. 55 is a cross-sectional view of the casing 112 of FIG. 54 taken in line 55—55 in FIG. 54. FIG. 56 shows the direction of air flow of the cooling means and the liquid crystal panel and the polarizer of FIGS. 54 and 55.

The cooling means includes a fan 156 arranged on the outer side of the casing 112 at a position corresponding to the second liquid crystal panel 132. An air duct 158 is mounted on the inner wall of the casing 112. The air duct 158, as its outline is shown in FIG. 54, is formed in such a shape as to cover three liquid crystal panels 130, 132 and 134, each having an air outlet. The air duct 158 is formed to blow the air in the first direction indicated by arrow A substantially parallel to the surface of the liquid crystal panels 130, 132 and 134 and the surface of the polarizer 138. The cooling air blown out of the air duct 158 is blown through between the liquid crystal panels 130, 132 and 134 and the polarizer 138 in the first direction indicated by arrow A.

Also, ducts 160, 162 and 164 are arranged in the neighborhood of the liquid crystal panels 130, 132 and 134, respectively, and extend toward the liquid crystal panels 130, 132 and 134, respectively. Small fans 161, 163 and 165 are arranged on the ducts 160, 162 and 164, respectively. The ducts 160, 162 and 164 are so formed as to blow the air in the second direction indicated by arrow B substantially in parallel to the surface of the liquid crystal panels 130, 132 and 134 and the surface of the polarizers 138. The cooling air blown out of the ducts 160, 162 and 164 is blown through between the liquid crystal panels 130, 132 and 134 and the polarizer 138 in the second direction indicated by arrow B.

The first direction indicated by arrow A and the second direction indicated by arrow B are perpendicular to each other and cross substantially at the centers of the liquid crystal panels 130, 132 and 134 and the polarizer 138. The air outlets of the air duct 158 are arranged in such a manner as to cool the whole surface of the liquid crystal panels 130, 132 and 134 and the whole surface of the polarizer 138. The air outlets of the ducts 160, 162 and 164, on the other hand, are arranged in such positions as to strategically cool the central portion of the surface of the liquid crystal panels 130, 132 and 134 and the surface of the polarizer 138.

With this configuration, components of the cooling air are introduced substantially in parallel to the surface of the polarizers 138 and the liquid crystal panels 130, 132 and 134 in the two crossing directions A and B, and impinge on each other at the central areas of the polarizers 138 and the liquid crystal panels 30, 32 and 34 thereby to cause a turbulent flow. As a result, the amount of the cooling air contacting the surface of the polarizers 138 and the liquid crystal panels 130, 132 and 134 increases. Thus, the cooling efficiency can be improved. At the same time, by setting the impinging position in the vicinity of the point of maximum temperature (central area of the polarizers and the liquid crystal panels), a uniform temperature distribution is obtained of the polarizers 138 and the liquid crystal panels 130, 132 and 134. In this way, the deterioration of the optical characteristics of the polarizers 138 and the liquid crystal panels 130, 132 and 134 which otherwise might be caused by overheat can be prevented, thereby improving the display quality.

The duct 158 including the large-sized cooling fan 156 blows the cooling air into the apparatus, so that the cooling air flows in the space between the liquid crystal panels and the polarizers 138 from the short sides of the liquid crystal panels 130, 132 and 134. The small-sized fans 161, 163, 165 blow the air from the long side of the liquid crystal panels at a velocity about one half that introduced from the short side. The two types of winds impinge on each other in the vicinity of the center of the panel, with the result that an appropriate turbulent flow occurs for an improved cooling efficiency.

Figure 57:
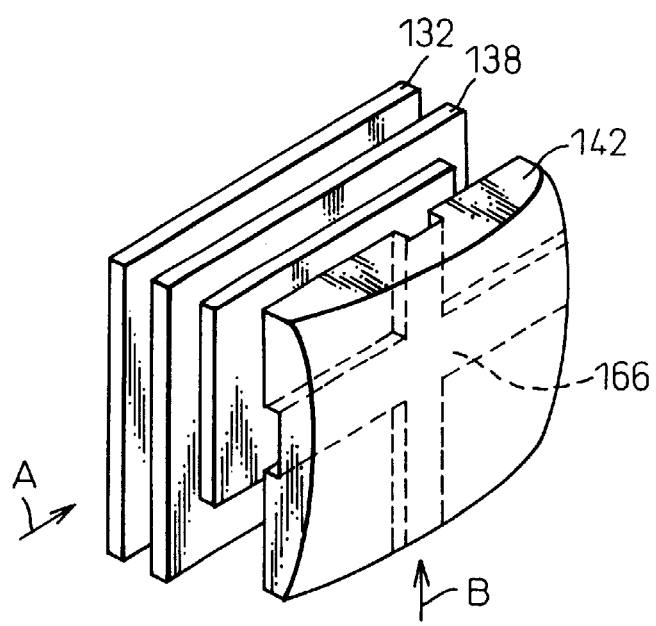
FIG. 57 is a perspective view showing still another example of the cooling means.

FIG. 57 shows another example of the cooling means. As in the preceding examples, the cooling air is sent between the polarizer 138 and the liquid crystal panel 132 in the first direction indicated by arrow A on the one hand and between the polarizer 138 and the liquid crystal panel 132 in the second direction indicated by arrow B at the same time. Further, the cooling air is blown between the polarizer 138 and the condenser lens 142. As a result, the polarizer 138 on the light incidence side is cooled more efficiently.

Further, the surface of the condenser lens 142 facing the polarizer 138 is formed flat, while the surface of the condenser lens 144 far from the polarizer 138 is formed in a curved shape. The condenser lens 142 has a groove 166 on the side facing the polarizer 138 for guiding the air. This groove is formed in a substantially cross shape. Specifically, the cross groove 166 includes two linear guide grooves crossing substantially at the centers of the liquid crystal panel 132 and the polarizer 138. Two flows of the cooling air proceed along the guide grooves and impinge on each other at the substantial centers of the liquid crystal panel 132 and the polarizer 138 and causes a turbulent flow. Thus, substantially the central area of the liquid crystal panel 132 and the polarizer 138 is cooled most efficiently. The guide grooves of the groove 166 extend through the center of the condenser lens 142 in parallel to the short and long sides. The width of the guide grooves is 7 mm and the depth thereof is 5 mm.

Table 1 shown below indicates the result of a test conducted with the configuration comprising a duct and a fan shown in FIGS. 54 to 56, representing the case in which the condenser lens 142 has the groove 166, and the case in which it has no such a groove.

TABLE 1

| Structure | Fan 56 | Fan 62 | Temp. at Center of Polarizer 38 |
|---|---|---|---|
| No groove | on | off | 45° C. |
| No groove | on | on | 41° C. |
| Groove | on | off | 45° C. |
| Groove | on | on | 35° C. |

The test was conducted at a room temperature, with the flow capacity of the fan 156 set to 20 m/sec and the flow capacity of the fan 162 set to 0.5 m/sec In the case where the condenser lens 142 has the groove 166, a very satisfactory cooling performance is obtained. In the optical system shown in FIG. 49, the condenser lens 142 is arranged as near to the polarizer 138 as possible, and the distance between the condenser lens 142 and the polarizer 138 is desirably not more than 10 mm. In such a case, the air is not easily passed between the condenser lens 142 and the polarizer 138. Nevertheless, the provision of the groove 166 in the condenser lens 142 makes it possible to cool the polarizer 138 satisfactorily. Also, in the presence of the groove 166 in the condenser lens 142, a ghost image is not generated by the reflection on the surface of the groove 166.

Figure 58:
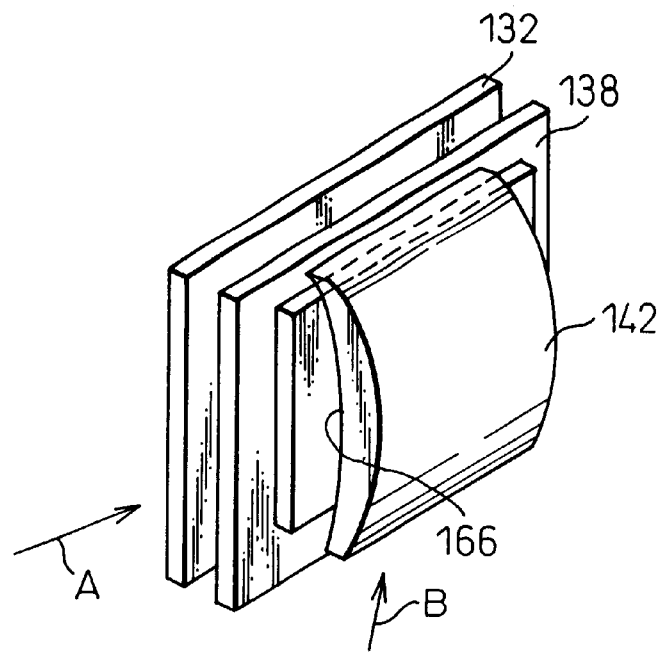
FIG. 58 is a perspective view showing a further example of the cooling means.
Figure 59:
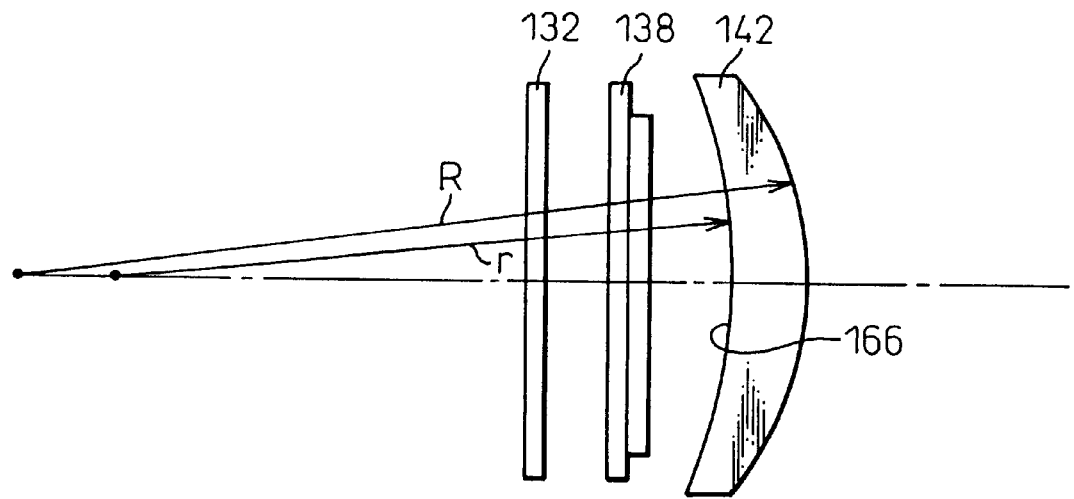
FIG. 59 is a side view showing the cooling means of FIG. 58.

FIGS. 58 and 59 show still another example of the cooling means. As in the preceding cases, the cooling air is blown between the polarizer 138 and the liquid crystal panel 132, and the condenser lens 142 has the groove 166 on the side thereof facing the polarizer 138 for guiding the air. This groove 166 is formed with a smooth concave surface. In this embodiment, the outer surface of the condenser lens 142 is a convex cylinder having a radius R of 110 mm, and the inner surface of the condenser lens 42 is formed in a cylindrical concave surface having a radius r of 935 mm. In the cylindrical concave surface, the central portion or thereabouts of the condenser lens 142 is depressed 1 mm as compared with the end thereof, and therefore the distance between the polarizer 138 and the condenser lens 142 is increased. Thus, the cooling air is increased at the central portion or the vicinity thereof. In this case too, components of the cooling air blown from the two directions impinge on each other at the center or the vicinity thereof of the polarizer 138 and causes a turbulent flow. Therefore, the central portion or the vicinity thereof of the polarizer 38 is most efficiently cooled.

As described above, according to the present invention, the cooling air is sent in directions crossing each other and substantially in parallel to the surface of an optical element such as a polarizer and a liquid crystal panel, and components of the cooling air impinge on each other at the central portion thereby making it possible to cool the apparatus more effectively. Consequently, a projection type display apparatus with a higher brightness is obtained.

What is claimed is:

1. A projection type display apparatus comprising:
   a housing:
   at least one light valve arranged in said housing for forming an image light;
   a projection lens arranged in said housing for projecting in enlarged form the image light formed by said at least one light valve;
   at least one heat generating member arranged in said housing;
   at least one first fan for introducing cooling air into said housing so that said at least one light valve is exposed to said cooling air;
   at least one second fan arranged in said housing so that said at least one heat generating member is exposed directly to the cooling air; and
   at least one third fan for exhausting the cooling air out of said housing;
   wherein said at least one heat generating member includes a light source and said at least one light valve includes a plurality of light valves for realizing color display, and said at least one first fan includes a plurality of first fans arranged to introduce cooling air into said housing such that each said first fan directly blows cooling air to a corresponding one of said light valves.

2. A projection type display apparatus according to claim 1, wherein said at least one heat generating member comprises said light source, a power supply and a ballast.

3. A projection type display apparatus according to claim 1, wherein said color separation means comprises two dichroic mirrors, and said color synthesizing means comprises two transparent blocks having a dichroic film held between prisms.

4. A projection type display apparatus according to claim 3, wherein said at least one second fan includes a light source cooling fan, a power supply cooling fan and a ballast cooling fan, a portion of the cooling air introduced into said housing by said at least one first fan cools said plurality of said light valves, after which said air is exhausted out of said housing by said at least one third fan, the other portion of the cooling air introduced into said housing by said at least one first fan cools said plurality of said light valves, after which said other portion of the cooling air cools the light source, the power supply and the ballast by at least one second fan and then is exhausted out of said housing by said at least one third fan.

5. A projection type display apparatus according to claim 4, wherein said light source cooling fan is arranged on the side of said light source far from said at least one third fan, said power source cooling fan is arranged on the side of said power supply far from said at least one third fan, and said fan for cooling said ballast is arranged on the side of said ballast far from said at least one third fan.

6. A projection type display apparatus according to claim 4, wherein the capacity of said at least one second fan is smaller than the capacity of said at least one first fan.

7. A projection type display apparatus according to claim 6, wherein the exhaust capacity of said at least one third fan is substantially equal to or greater than the amount of fresh air intake of said at least one first fan.

8. A projection type display apparatus according to claim 1, wherein a duct extends from the cooling air outlet of said at least one first fan to the vicinity of said at least one light valve, and another duct extends from the cooling air outlet of said at least one second fan to the vicinity of said at least one heat generating member.

9. A projection type display apparatus according to claim 1, wherein said at least one first fan includes a plurality of fans corresponding to a plurality of light valves, said plurality of fans are installed at a portion of said housing lower than said plurality of said light valves so that the cooling air is blown upward toward each light valve, and an air inlet for introducing the external air is formed in the bottom portion of said housing, the opening area of said air inlet being larger than the opening area of the air inlets of said plurality of fans for cooling said plurality of said light valves.

10. A projection type display apparatus comprising:
   a light source including a lamp and a reflector having a front side and a rear side with said lamp arranged on said front side;
   at least one light valve receiving the light from said light source for forming an image light;
   a projection lens for projecting in enlarged form the image light formed by at least one light valve;
   a light source cooling unit, said light source cooling unit including a lamp house accommodating said lamp and said reflector, a cooling fan, and a duct for guiding cooling air from said cooling fan to said lamp house;
   said duct having an air inlet for introducing the air from said cooling fan, and a first air outlet;
   said lamp house having a first air inlet for guiding the cooling air from the first air outlet of said duct and an exhaust outlet for exhausting the cooling air out of said lamp house; and
   the first air inlet of said lamp house being configured to blow out the cooling air to said rear side of said reflector;
   wherein said lamp house is arranged with a small gap between said lamp house and said duct such that said lamp house is movable relative to said duct, and said first air outlet and said first air inlet are arranged with a small gap therebetween.

11. A projection type display apparatus according to claim 10, wherein a flow control member for controlling the flow of the cooling air from the first air outlet of said duct to the first air inlet of said lamp house is arranged at the first air outlet of said duct.

12. A projection type display apparatus according to claim 10, wherein a flow control member for controlling the flow of the cooling air from the first air outlet of said duct to the first air inlet of said lamp house is arranged at the first air inlet of said lamp house.

13. A projection type display apparatus according to claim 10, wherein said duct has a second air outlet, and said lamp house includes a second air inlet for introducing the cooling air from said second air outlet of said duct and blowing out the cooling air to the front side of said reflector.

14. A projection type display apparatus according to claim 13, wherein a flow control member for controlling the flow of the cooling air from the second air outlet of said duct to the second air inlet of said lamp house is arranged at the second air outlet of said duct.

15. A projection type display apparatus according to claim 13, wherein a flow control member for controlling the flow of the cooling air from the second air outlet of said duct to the second air inlet of said lamp house is arranged at the second air inlet of said lamp house.

16. A projection type display apparatus according to claim 13, wherein a first flow control member for controlling the flow of the cooling air from the first air outlet of said duct to the first air inlet of said lamp house is arranged at the first air outlet of said duct;
   a second flow control member for controlling the flow of the cooling air from the first air outlet of said duct to the first air inlet of said lamp house is arranged at the first air inlet of said lamp house;
   a third flow control member for controlling the flow of the cooling air from the second air outlet of said duct to the second air inlet of said lamp house is arranged at the second air outlet of said duct; and
   a fourth flow control member for controlling the flow of the cooling air from the second air outlet of said duct to the second air inlet of said lamp house is arranged at the second air inlet of said lamp house.

17. A projection type display apparatus according to claim 13, wherein the first and second air inlets of said lamp house are arranged on the upper wall of said lamp house with the lamp installed.

18. A projection type display apparatus according to claim 13, wherein the first and second air inlets of said lamp house are arranged on the side wall of said lamp house with the lamp installed.

19. A projection type display apparatus according to claim 13, wherein a part of the outer peripheral portion of said reflector is cut, and the second air inlet of said lamp house is arranged in the vicinity of the cut portion of the outer peripheral portion of said reflector.

20. A projection type display apparatus according to claim 10, wherein said lamp house is arranged movably with respect to said duct.

21. A projection type display apparatus according to claim 10, further comprising a housing accommodating said at least one light valve and said light source, an intake fan for introducing the cooling air into said housing, and an exhaust fan for exhausting the cooling air from said housing, the cooling fan for cooling said light source introducing cooling air flowing in said housing toward said exhaust fan from said intake fan.

22. A projection type display apparatus comprising:
   a light source including a lamp and a reflector having the front side and the rear side with said lamp arranged on said front side;
   at least one light valve for receiving the light from said light source and forming an image light;
   a projection lens for projecting, in enlarged form, the image light formed by said at least one light valve;
   a light source cooling unit, said light source cooling unit including a lamp house accommodating said lamp and said reflector, a cooling fan, and a duct for guiding the cooling air from said cooling fan to said lamp house;
   said duct having an air inlet and an air outlet for the air from said cooling fan;
   said lamp house having an air inlet for introducing the cooling air from the air outlet of said duct and an exhaust port for exhausting the cooling air out of said lamp house;

the air inlet of said lamp house being configured to blow out the cooling air to said front side of said reflector; and a flow control member for controlling the flow of the cooling air from said air outlet of said duct to said air inlet of said lamp house, said flow control member being arranged at said air inlet of said lamp house;

wherein said lamp house is arranged with a small gap between said lamp house and said duct such that said lamp house is movable relative to said duct, and said first air outlet and said first air inlet are arranged with a small gap therebetween.

23. A projection type display apparatus according to claim 22, wherein said air inlet of said lamp house is arranged on the upper wall of said lamp house with the lamp installed thereon.

24. A projection type display apparatus according to claim 22, wherein the first and second air inlets of said lamp house are arranged on the side wall of said lamp house with the lamp installed thereon.

25. A projection type display apparatus according to claim 22, wherein a part of the outer peripheral portion of said reflector is cut, and the air inlet of said lamp house is arranged in the vicinity of the cut part of said outer peripheral portion of said reflector.

26. A projection type display apparatus according to claim 25, wherein a part of the outer peripheral portion of said reflector is cut, and the exhaust port of said lamp house is arranged in the vicinity of the cut part of said outer peripheral portion of said reflector.

27. A projection type display apparatus according to claim 22, wherein said lamp house is arranged movably with respect to said duct.

28. A projection type display apparatus according to claim 22, further comprising a housing for accommodating said at least one light valve and said light source, an intake fan for introducing the cooling air into said housing, and an exhaust fan for exhausting the cooling air from said housing, the cooling fan for cooling said light source introducing cooling air flowing in said housing from said intake fan toward said exhaust fan.

29. A projection type display apparatus according to claim 22, wherein said lamp comprises a metal halide lamp having a tip portion, and the tip portion of said lamp is configured to be arranged on the side of said lamp house far from the side of the lamp exposed to the cooling air blown out of the air inlet of said lamp house.

30. A projection type display apparatus comprising:

a light source;

a color separation member for separating the light emitted from the light source into a plurality of color light beams;

a plurality of light valves for receiving the separated color light beams and forming an image light;

a color synthesizing member for synthesizing the light beams emitted from said plurality of said light valves into one synthesized light;

a projection lens for projecting in enlarged form said synthesized light;

in said color separation member and said color synthesizing member including dichroic mirrors and total reflection mirrors, at least one of said dichroic mirrors being held to a fixed structure by three holding members, each of said holding members being arranged to hold one point on one side of said one mirror and a corresponding point on the other side of said one mirror, substantially by point contact.

31. A projection type display apparatus according to claim 30, wherein said fixed structure includes a support member having an opening.

32. A projection type display apparatus according to claim 30, wherein said holding members each have a pair of arms with protrusions in opposed relation to each other for sandwiching at least one of said dichroic mirrors and said total reflection mirrors.

33. A projection type display apparatus according to claim 32, wherein said pair of said arms are fixed to each other by a fixing member at the ends thereof far from said protrusions.

34. A projection type display apparatus according to claim 32, wherein said arms are formed of a spring material, and the interval of said two protrusions is smaller than the thickness of said mirror.

35. A projection type display apparatus according to claim 30, wherein at least one of said dichroic mirrors and said total reflection mirrors has a rectangular shape, and two of said holding members are arranged on one side of said one mirror, the remaining one of said holding members being arranged on one side on the far side of said mirror.

36. A projection type display apparatus according to claim 35, wherein two of the three holding members for holding at least one of said dichroic mirrors and said total reflection mirrors are arranged under the mirror in such a manner as to support the weight of the mirror, and the remaining one holding member is arranged on the upper side of the mirror.

37. A projection type display apparatus according to claim 30, wherein at least one of said dichroic mirror and said total reflection mirror has a rectangular shape, two holding members are arranged on one side of said mirror, the remaining one of the holding members being arranged on one side on the far side of said mirror, and a mirror fixing mechanism is arranged in association with the other side of said mirror.

38. A projection type display apparatus according to claim 30, wherein at least one of said dichroic mirror and said total reflection mirror has a rectangular shape, two holding members are arranged on one side of said mirror, the remaining one of the holding members being arranged on one side on the far side of said mirror, and an adhesive is arranged in association with the other side of said mirror.

39. A projection type display apparatus comprising:

a light source;

at least one light valve for forming an image light;

a projection lens for projecting, in an enlarged form, the image light formed by said at least one light valve;

a screen for visualizing said image projected in enlarged form;

a mirror arranged between said projection lens and said screen; and said mirror being held to a fixed structure by three holding members, each holding member being arranged to hold one point on one surface of said mirror and a corresponding one point on the other surface of said mirror substantially by point contact.

40. A projection type display apparatus comprising a polarizer and a light valve receiving polarized light passing through said polarizer; and said polarizer including a transparent crystalline substrate and a film-like polarized light generating member.

41. A projection type display apparatus according to claim 40, wherein said transparent crystal substrate is made of one of sapphire and diamond.

42. A projection type display apparatus according to claim 40, wherein the direction of the long axis and the short axis of an ellipsoid of index of refraction in said transparent crystalline substrate is coincident with the polarization axis of said film-like polarized light generating member.

43. A projection type display apparatus comprising:

a light source;

at least one optical element;

a cooling unit for said at least one optical element; and a projection lens;

wherein light emitted from said light source is modulated by said at least one optical element and is projected from said projection lens; and said cooling unit includes a first blowing member for blowing air in a first direction substantially parallel to the surface of said at least one optical element and a second blowing member for blowing air in a second direction crossing said first direction in the vicinity of said at least one optical element;

further wherein said first blowing member includes a first duct extending to a position near said at least one optical element and said second blowing member includes a second duct extending to a position near said at least one optical element, and said first and second ducts intersect each other.

44. A projection type display apparatus according to claim 43, wherein one of said first and second blowing means is arranged to cool the whole surface of said at least one optical element, and the other of said first and second blowing means is arranged to cool a specific portion of the surface of said at least one optical element.

45. A projection type display apparatus according to claim 43, wherein said first and second blowing means include a common duct portion and a branch duct portion branching from said common duct portion.

46. A projection type display apparatus according to claim 43, wherein one of said first and second blowing means includes a first fan, and the other of said first and second blowing means includes a second fan.

47. A projection type display apparatus according to claim 43, wherein said first direction and said second direction cross each other at or in the vicinity of the maximum heat generating point of said at least one optical element.

48. A projection type display apparatus according to claim 43, wherein said at least one optical element has a rectangular shape, and said first direction and said second direction are perpendicular to the long side and the short side, respectively, of said rectangle.

49. A projection type display apparatus comprising:

a light source;

at least one optical element;

a cooling unit for said at least one optical element; and a projection lens;

wherein light emitted from said light source is modulated by said at least one optical element and is projected from said projection lens; and said cooling unit includes a first blowing member for blowing air in a first direction substantially parallel to the surface of said at least one optical element and a second blowing member for blowing air in a second direction crossing said first direction in the vicinity of said at least one optical element;

further wherein said at least one optical element includes a liquid crystal panel, a first polarizer arranged on the side of said liquid crystal panel nearer to said light source, and a second polarizer arranged on the side of said liquid crystal panel nearer to said projection lens, and said cooling means blows the air primarily between the surface of said liquid crystal panel and the surface of said first polarizer.

50. A projection type display apparatus comprising:

a light source;

at least one optical element;

a cooling unit for said at least one optical element; and a projection lens;

wherein light emitted from said light source is modulated by said at least one optical element and is projected from said projection lens; and said cooling unit includes a first blowing member for blowing air in a first direction substantially parallel to the surface of said at least one optical element and a second blowing member for blowing air in a second direction crossing said first direction in the vicinity of said at least one optical element;

further wherein said at least one optical element includes a liquid crystal panel, a first polarizer arranged on the side of said liquid crystal panel nearer to said light source, a second polarizer arranged on the side of said liquid crystal panel nearer to said projection lens, and a condenser lens, and said cooling means blows the air primarily between the surface of said first polarizer and the surface of said condenser lens.

51. A projection type display apparatus according to claim 50, wherein said condenser lens has a groove, for guiding the air, in the side thereof facing said first polarizer.

* * * * *